(12) United States Patent
Barbaresi et al.

(10) Patent No.: US 7,912,021 B2
(45) Date of Patent: Mar. 22, 2011

(54) METHOD AND SYSTEM FOR SIMULATING A COMMUNICATION NETWORK, RELATED NETWORK AND COMPUTER PROGRAM PRODUCT THEREFOR

(75) Inventors: Andrea Barbaresi, Turin (IT); Massimo Colonna, Turin (IT); Paolo Goria, Turin (IT); Giovanna Zarba, Turin (IT)

(73) Assignee: Telecom Italia S.p.A., Milan (IT)

( * ) Notice: Subject to any disclaimer, the term of this patent is extended or adjusted under 35 U.S.C. 154(b) by 224 days.

(21) Appl. No.: 12/086,866

(22) PCT Filed: Dec. 22, 2005

(86) PCT No.: PCT/EP2005/013883
§ 371 (c)(1),
(2), (4) Date: Aug. 15, 2008

(87) PCT Pub. No.: WO2007/071277
PCT Pub. Date: Jun. 28, 2007

(65) Prior Publication Data
US 2009/0028059 A1 Jan. 29, 2009

(51) Int. Cl.
*H04W 4/00* (2009.01)
(52) U.S. Cl. .................................. 370/338; 370/252
(58) Field of Classification Search ............... 370/252, 370/338, 470
See application file for complete search history.

(56) References Cited

U.S. PATENT DOCUMENTS

| | | | | |
|---|---|---|---|---|
| 7,165,173 B1 * | 1/2007 | Herle | .......................... | 713/151 |
| 7,305,009 B2 * | 12/2007 | Gaskill | ........................ | 370/470 |
| 7,468,951 B2 * | 12/2008 | Qian et al. | .................... | 370/252 |
| 7,519,864 B2 * | 4/2009 | Alam et al. | ..................... | 714/32 |
| 7,672,308 B2 * | 3/2010 | Montes Linares | ....... | 370/395.21 |
| 2002/0080756 A1 | 6/2002 | Coppola et al. | | |
| 2003/0061017 A1 | 3/2003 | Dotaro et al. | | |

(Continued)

FOREIGN PATENT DOCUMENTS

EP 1 359 780 A1 11/2003

(Continued)

OTHER PUBLICATIONS

"3GPP System to Wireless Local Area Network (WLAN) Interworking; System Description", Universal Mobile Telecommunication System (UMTS), (3GPP TS 23.234 Version 6.6.0 (Release 6); ETSI TS 123 234, V6.6.0, pp. 1-80, (2005).

(Continued)

*Primary Examiner* — Phuc Tran
(74) *Attorney, Agent, or Firm* — Finnegan, Henderson, Farabow, Garrett & Dunner, L.L.P.

(57) ABSTRACT

A simulator system for simulating a wireless local area network in a combination of a wireless local area network and one or more 2G or 3G mobile communication networks includes a first set and a second set of access protocol simulation devices representative of wireless local area network apparatus implementing access protocols. The first set of access protocol simulation devices is representative of radio technology independent apparatus providing integration of the wireless local area network with the mobile communication network(s). The second set of access protocol simulation devices is representative of radio technology dependent apparatus present in the wireless local area network. The simulator is thus configured for simulating different types of wireless local area network technology in the wireless local area network by varying the access protocol simulation devices in the second set while maintaining the access protocol simulating devices in the first set.

24 Claims, 13 Drawing Sheets

U.S. PATENT DOCUMENTS

| | | | |
|---|---|---|---|
| 2003/0204390 A1 | 10/2003 | Bizzarri et al. | |
| 2006/0223045 A1* | 10/2006 | Lowe | 434/379 |
| 2009/0187395 A1* | 7/2009 | Manohar et al. | 703/17 |
| 2009/0209866 A1* | 8/2009 | Abovitz et al. | 600/476 |

FOREIGN PATENT DOCUMENTS

| | | |
|---|---|---|
| WO | WO 01/54350 A2 | 7/2001 |
| WO | WO 02/104055 A1 | 12/2002 |
| WO | WO 2005/060293 A1 | 6/2005 |

OTHER PUBLICATIONS

"Generic Access to the A/Gb Interface; Stage 2" (Release 6), $3^{rd}$ Generation Partnership Project Technical Specification Group GSM/Edge Radio Access Network; 3GPP TS 43.318, V6.0.0, pp. 1-68, (2005).

"Generic Access (GA) to the A/Gb Interface; Mobile GA Interface Layer 3 Specification (Release 6)"; $3^{rd}$ Generation Partnership Project; 3GPP TS 44.318 V6.0.0, pp. 1-145, (2005).

"UMA User Perspective (Stage 1)"; Unlicensed Mobile Access (UMA), RT.0.0 , pp. 1-29, (2004).

"UMA Architecture (Stage 2)"; Unlicensed Mobile Access (UMA), R1.0.4, pp. 1-87, (2005).

"UMA Protocols (Stage 3)"; Unlicensed Mobile Access (UMA), R1.0.4, pp. 1-162, (2005).

"Feasibility Study on 3GPP System to Wireless Local Area Network (WLAN) Interworking (Release 6)"; $3^{RD}$ Generation Partnership Project, 3 GPP TR 22.934, V6.2.0, pp. 1-30, (2003).

"3GPP System to Wireless Local Area Network (WLAN) Interworking; User Equipment (UE) to Network Protocols; Stage 3, (Release 6)"; 3rd Generation Partnership Project; Technical Specification Group Core Network; 3GPP TS 24.234, V6.0.0, pp. 1-24, (2004).

Aboba et al.; "Extensible Authentication Protocol (EAP)"; The Internet Society, Network Working Group, Request for Comments: 3748, pp. 1-56, (2004).

Arrko et al.; "Extensible Authentication Protocol Method for $3^{RD}$ Generation Authentication and Key Agreement (EAP-AKA)", draft-arkko=ppext-eap-aka-15.txt; The Internet Society, Network Working Group, Internet Draft, pp. 1-67, (2004).

Haverinen et al.; "Extensible Authentication Protocol Method for GSM Subscriber Identity Modules (EAP-SIM)"; draft-haverinen-pppext-eap-sim-16.txt; The Internet Society, Network Working Group, Internet Draft, pp. 1-91, (2004).

"Part 11: Wireless LAN Medium Access Control (MAC) and Physical Layer (PHY) Specifications: Higher-Speed Physical Layer Extension in the 2.4 GHz Band"; IEEE Std. 802.11b, pp. i-vii, 1-89, (1999).

"Part 11: Wireless LAN Medium Access Control (MAC) and Physical Layer (PHY) Specifications: High Speed Physical Layer in the 5 GHz Band"; IEEE Std. 802.11a, pp. i-viii, 1-83, (1999).

"Part 11: Wireless LAN Medium Access Control (MAC) and Physical Layer (PHY) Specifications: Amendment 4: Further Higher Data Rate Extension in the 2.4 GHz Band"; IEEE Std. 802.11g™, (Amendment to IEEE Std. 802.11™, 1999 Edition); pp. i-x, 1-67, (2003).

"Part 11: Wireless LAN Medium Access Control (MAC) and Physical Layer (PHY) Specifications: Amendment 5: Spectrum and Transmit Power Management Extensions in the 5 GHz Band in Europe"; IEEE Std. 802.11h™, (Amendment to IEEE Std. 802.11™, 1999 Edition), pp. i-xiv, 1-59, (2003).

"Packet Based Convergence Layer; Part 1: Common Part"; Broadband Radio Access Networks (BRAN); Hiperlan Type 2; ETSI TS 101 493-1, V1.1.1, pp. 1-27, (2004).

"Packet Based Convergance Layer; Part 2: Ethernet Service Specific Convergence Sublayer (SSCS)"; Broadband Radio Access Networks (BRAN); Hiperlan Type 2, ETSI TS 101 493-2, V1.1.1, pp. 1-31, (2000).

"Data Link Control (DLC) Layer; Part 2: Radio Link Control (RLC) Sublayer"; Broadband Radio Access Networks (BRAN); Hiperlan Type 2, ETSI TS 101 761-2, V1.2.1, pp. 1-196, (2001).

"Data Link Control (DLC) Layer; Part 1: Basic Data Transport Functions"; Broadband Radio Access Networks (BRAN); Hiperlan Type 2, ETSI TS 101 761-1, V1.2.1, pp. 1-87, (2000).

"Physical (PHY) Layer"; Broadband Radio Access Networks (BRAN); Hiperlan Type 2, ETSI TS 101 475, V1.2.2, pp. 1-41, (2001).

"DARPA Internet Program Protocol Specification"; Internet Protocol, RFC: 791, by Information Sciences Institute, University of Southern California, pp. i-iii, 1-45, (1981).

Rappaport; "Wireless Communications—Principles and Practices"; Prentice Hall, PTR, New Jersey, pp. 70-73, and 122-133, (1996).

"Part 11: Wireless LAN Medium Access Control (MAC) and Physical Layer (PHY) Specifications"; Information Technology—, Telecommunications Information Exchange Between Systems—, Local and Metropolitan Area Networks—, Specific Requirements—, ANSI/IEEE Std., 802.11, 1999 Edition, pp. 21-23, (2003).

Kamerman et al.; "Wavelan©-II: A High-Performance Wireless LAN for the Unlicensed Band"; Bell Labs Technical Journal, pp. 118-133, (1997).

* cited by examiner

METHOD AND SYSTEM FOR SIMULATING A COMMUNICATION NETWORK, RELATED NETWORK AND COMPUTER PROGRAM PRODUCT THEREFOR

CROSS REFERENCE TO RELATED APPLICATION

This application is a national phase application based on PCT/EP2005/013883, filed Dec. 22, 2005.

FIELD OF THE INVENTION

The present invention relates to techniques for simulating communication networks.

The invention has been devised with particular attention paid to the possible use in situations where one or more mobile cellular networks (e.g. GSM, GPRS, EDGE, UMTS) are integrated with a local area network such as a wireless local area network (WLAN).

DESCRIPTION OF THE RELATED ART

Simulation is an essential step in planning, designing, realising and managing communication networks, especially as regards network performance optimization. Simulation plays an important role when a new network is planned as well as when the performance level of an already set-up network is to be updated and optimised.

The document WO-A-2005/060293 describes a simulator for a communication network with an object-based architecture wherein each single object represents the model of a real physical network device. The simulated network may correspond to various types of systems, such as GSM, GPRS, UMTS, WLAN, and fixed networks. In order to permit simulation of networks operating according to a plurality of different systems, the simulator architecture is configured in such a way that, at the simulation level, the physical devices in the network are arranged in:
  a first set of devices (NCS, HOST), completely independent of the system that regulates the operation of the network; operation of the devices of this first set is thus totally independent from such a system,
  a second set of devices (MS/UE, NodeB, RNC, BTS, BSC) which depend on the system under consideration; operation of the devices of this second set is thus identical for at least some of a plurality of systems to be simulated, and
  a third set of devices (MSC, SGSN, GGSN) for the interwork between said first set and said second set, the devices of said third set being able to interact with said devices independent of the system under consideration, whereby operation of the devices in the third set is specific for the system considered.

Various international standardization authorities have already defined or are in the process of defining different solutions for integrating mobile cellular networks and WLAN systems. These solutions include e.g. the arrangements disclosed e.g. in the documents IWLAN: 3GPP TS 23.234, "3GPP system to Wireless Local Area Network (WLAN) interworking; System description"; Generic Access Architecture (GAN): 3GPP TS 43.318, "Generic access to the A/Gb interface; Stage 2 (Release 6)", 3GPP TS 44.318, "Generic Access (GA) to the A/Gb interface; Mobile GA interface layer 3 specification (Release 6)"; Unlicensed Mobile Access (UMA)—UMA Stage 1 R1.0, "User Perspective Specification", UMA Stage 2 R1.0.4, "Architecture Specification", UMA Stage 3 R1.0.4, "Protocol Specification").

In WO-A-2005/060293 the integration of a WLAN system with a communication network is achieved with the simple substitution and/or with the addition of an access network.

OBJECT AND SUMMARY OF THE INVENTION

The Applicant has noted that in WO-A-2005/060293 the integration of a WLAN system with a communication network is achieved with the simple substitution and/or with the addition of an access network. Simulation architectures where the integration of a WLAN system with a communication network is achieved with the simple substitution and/or with the addition of an access network do not properly take into account the different modes of integration discussed in the foregoing.

Therefore the Applicant has observed that a problem exists in achieving a simulator architecture that is able to estimate the performance of a WLAN system completely integrated with one or more mobile cellular networks. By "completely integrated" an arrangement is meant where integration of the resulting network is achieved at the user level, at the access network level and at the core network level.

A need can exist for solutions capable of managing communication networks in a more satisfactory way as compared to the solutions according to the prior art described previously. This applies primarily to the capability of simulating communication networks, such as e.g. a cellular radio-mobile network, able to managing the total inter-operability of the cellular network with a WLAN system.

The WLAN system can be implemented with any type of wireless local area network (WLAN) technology. Exemplary of such a technology is any technology compliant with the:
  IEEE 802.11 standard in its various versions (802.11a, 802.11b, 802.11g, 802.11h),
  HIPERLAN standard in its various versions (HIPERLAN Type 1 and HIPERLAN Type 2)
  Bluetooth standard.

The radio-mobile system(s) can be implemented with any type of cellular radio-mobile network based on, i.e., GSM/GPRS standard (Global System for Mobile Communications/General Packet Radio Service), EDGE standard (Enhanced Data for GSM Evolution), HSDPA standard (High-Speed Downlink Packet Access), UMTS standard (Universal Mobile Telecommunication System), Super3G, HSUPA standard (High-Speed Uplink Packet Access), CDMA2000 standard (Code Division Multiple Access 2000), IS-95 standard (Interim Standard 95).

The object of the invention is thus to provide a satisfactory response to that need.

According to the present invention, that object is achieved by means of a method having the features set forth in the claims that follow. The invention also relates to a corresponding system (i.e. a simulator), a corresponding simulated network as well as a related computer program product, loadable in the memory of at least one computer and including software code portions for performing the steps of the method of the invention when the product is run on a computer. As used herein, reference to such a computer program product is intended to be equivalent to reference to a computer-readable medium containing instructions for controlling a computer system to coordinate the performance of the method of the invention. Reference to "at least one computer" is evidently intended to highlight the possibility for the present invention to be implemented in a distributed/modular fashion.

A preferred embodiment of the invention is thus a method for simulating a Wireless Local Area Network (WLAN) integrated with one or more mobile communication networks by providing a first set and a second set of access protocol simulation devices representative of WLAN network apparatus implementing access protocols. The first set of access protocol simulation devices is representative of radio technology independent apparatus providing integration of said WLAN with said mobile communication network(s). The second set of access protocol simulation devices is representative of radio technology dependent apparatus present in said WLAN. Different types of WLAN technology in said WLAN may thus be simulated by varying the access protocol simulation devices in said second set while maintaining the access protocol simulating devices in said first set.

Preferably, said method includes the step of selecting said at least one mobile communication network out of:
 a second generation mobile communication network;
 a third generation mobile communication network; or
 a combined second generation and third generation mobile communication network.

Preferably, said method includes the step of selecting said at least one mobile communication network as a combined mobile communication network comprising a plurality of interoperating mobile communication networks.

Preferably, said method comprises the step of including in said second set of access protocols simulation devices for simulating integration with at least one wired technology network, such as an xDSL network.

Preferably, said method includes the step of including in said second set of access protocol simulation devices, simulation devices representative of WLAN network apparatus selected out of: Wireless Metropolitan Area Network, High PErformance Radio ACCESS Network, High PErformance Radio Metropolitan Area Network, IEEE 802.16, Wireless Personal Area Network, Bluetooth and IEEE 802.15 networks.

Preferably, said method includes the step of providing terminal simulation devices representative of the terminals in said combination, wherein said terminal simulation devices are selected out of:
 first terminal simulation devices representative of WLAN-only terminals provided only with a WLAN interface, and
 second terminal simulation devices representative of plural mode terminals provided with WLAN plus mobile communication network interfaces.

Preferably, said second terminal simulation devices include simulation devices representative of:
 dual-mode terminals provided with a WLAN interface plus one of a second generation interface and a third generation interface, and
 multimode terminals provided with a WLAN interface plus second generation and third generation interfaces.

Preferably, said method includes the step of providing access network simulation devices representative of access network devices in said WLAN including access point and access point controller apparatus.

Preferably, said method includes the step of providing said first set of access protocol simulation devices both for said access point apparatus and for said access point controller apparatus.

Preferably, said method includes the step of providing core network simulation devices representative of apparatus in the core network of said WLAN providing packet switched services over said WLAN.

Preferably, said core network simulation devices include simulation devices representative of apparatus in said WLAN selected out of wireless access gateway apparatus and packet data gateway apparatus.

Preferably, said method includes the step of providing core network simulation devices representative of said Wireless Access Gateway apparatus configured for acting as an IP router for routing IP packets exchanged between the access point controller apparatus and said packet data gateway.

Preferably, said method includes the step of providing core network simulating devices representative of packet data gateway apparatus in said WLAN to terminate both the IP protocol within the core network of said WLAN and the tunnelling with the terminals in said WLAN.

A further preferred embodiment of the invention is a simulator system for simulating a Wireless Local Area Network in a combination of said wireless Local Area Network and at least one mobile communication network, the system including a first set and a second set of access protocol simulation devices representative of WLAN network apparatus implementing access protocols, wherein said first set of access protocol simulation devices is representative of radio technology independent apparatus providing integration of said WLAN with said at least one mobile communication network and said second set of access protocol simulation devices is representative of radio technology dependent apparatus present in said WLAN, the system configured for simulating different types of WLAN technology in said WLAN by varying the access protocol simulation devices in said second set while maintaining the access protocol simulating devices in said first set.

Preferably, said at least one mobile communication network is selected out of:
 a second generation mobile communication network;
 third generation mobile communication network; or
 a combined second generation and third generation mobile communication network.

Preferably, said at least one mobile communication network is selected as a combined mobile communication network comprising a plurality of interoperating mobile communication networks.

Preferably, said second set of access protocols simulation devices includes simulation devices for simulating integration with at least one wired technology network, such as an xDSL network.

Preferably, said second set of access protocol simulation devices includes simulation devices representative of WLAN network apparatus selected out of: Wireless Metropolitan Area Network, High PErformance Radio ACCESS Network, High PErformance Radio Metropolitan Area Network, IEEE 802.16, Wireless Personal Area Network, Bluetooth and IEEE 802.15 networks.

Preferably, said system includes terminal simulation devices representative of the terminals in said combination, wherein said terminal simulation devices are selected out of:
 first terminal simulation devices representative of WLAN-only terminals provided only with a WLAN interface, and
 second terminal simulation devices representative of plural mode terminals provided with WLAN plus mobile communication network interfaces.

Preferably, said second terminal simulation devices include simulation devices representative of:
 dual-mode terminals provided with a WLAN interface plus one of a second generation interface and a third generation interface, and multimode terminals provided with a WLAN interface plus second generation and third generation interfaces.

Preferably, said system includes access network simulation devices representative of access network devices in said WLAN including access point and access point controller apparatus.

Preferably, said system includes said first set of access protocol simulation devices both for said access point apparatus and for said access point controller apparatus.

Preferably, said system includes core network simulation devices representative of apparatus in the core network of said WLAN providing packet switched services over said WLAN.

Preferably, said core network simulation devices include simulation devices representative of apparatus in said WLAN selected out of wireless access gateway apparatus and packet data gateway apparatus Preferably, said system includes core network simulation devices representative of said wireless Access Gateway apparatus configured for acting as an IP router for routing IP packets exchanged between the access point controller apparatus and said packet data gateway.

Preferably, said system includes core network simulating devices representative of packet data gateway apparatus in said WLAN to terminate both the IP protocol within the core network of said WLAN and the tunnelling with the terminals in said WLAN.

Such a simulator architecture is therefore able to simulate at least one of the following macro-scenario:

a) a WLAN system interconnected to a radio-mobile system by means of the so-called "loose coupling" modality. Such modality of integration provides interconnection to the two Core Networks, namely the Core Network of the cellular radio-mobile system and the Core Network of the WLAN system, while the two access networks are kept separated;

b) a WLAN system interconnected to a radio-mobile system by means of the so-called "tight coupling" modality. Such modality provides either the interconnection of the two Access Networks, namely the Access Network of the cellular radio-mobile system and the Access Network of the WLAN system, or the interconnection between the access network of the WLAN system and the Core Network of the cellular radiomobile system.

The arrangement described is also able to simulate a third macro-scenario, namely a stand-alone WLAN system.

For the simulation of the aforesaid scenarios, the arrangement described herein preferably comprises the following devices:

MS/UE/STA terminal (Mobile Station/User Equipment/STAtion): it represents a mobile terminal with a WLAN radio interface. The mobile terminal can be of three different types, according to the kind of interface owned, and in particular can be a:

WLAN "single mode" terminal: terminal equipped with a single WLAN interface, briefly referred as STA in the following of the present description;

WLAN "dual mode" terminal: terminal equipped with a WLAN interface and a GSM/GPRS/EDGE interface (briefly referred as MS/STA in the following) or equipped with a WLAN interface and an UMTS interface (briefly referred as UE/STA in the following);

multimode terminal: terminal equipped with a WLAN interface, a GSM/GPRS/EDGE interface and an UMTS interface (briefly referred as MS/UE/STA in the following);

WLAN access devices AP (Access Point) and APC (Access Point Controller) with the following functionalities:

AP: it terminates all the protocols related to the specific radio technology (Radio Technology Dependent block) and it collaborates with the APC in order to guarantee the security of the WLAN users by means of the protocols of the Radio Technology Independent block.

APC: it provides the implementation of the protocols that allow the integration of the WLAN access network with the mobile communication network and manages the security of the WLAN users by means of the specific protocols (EAP, EAP-SIM and EAP-AKA) and in cooperation with the proper mobile cellular network devices;

WLAN Core Network device for PS (Packet Switched) services offered through the WLAN: WAG (Wireless Access Gateway) and PDG (Packet Data Gateway). The WAG device performs the IP router function and executes the routing of the IP packets exchanged between the APC/APCs of the WLAN access network/s and the PDG of the WLAN Core Network, while the PDG device terminates both the IP protocol in the Core Network and the Tunnelling protocol with the STA terminal.

Preferably, the block that in the WLAN network equipments implements the access protocols, i.e. the Access Stratum block, can in turn be subdivided into two portions:

a first portion common to all the WLAN radio technologies and able to realize the integration of the WLAN systems with the radio-mobile systems (referred as "Radio Independent Technology" in the following of the present description); and• a second portion depending on the particular WLAN radio technology supposed to be simulated (referred as "Radio Dependent Technology" in the following of the present description).

Advantageously, this subdivision renders the simulator architecture flexible and usable to simulate the integration between the different WLAN technologies and the various radio-mobile systems.

In the arrangement described herein, the integration can be achieved by simply changing some modules comprised in the "Radio Dependent Technology" portion, without modifying those modules adapted to the integration. Changing the modules of the "Radio Dependent Technology" portion makes it also possible to simulate the integration between a radio-mobile systems and a WMAN network (Wireless Metropolitan Area Network), such as those compliant with the ETSI HIPERACCESS standard (HIgh PErformance Radio ACCESS Network), the ETSI HIPERMAN standard (HIgh PErformance Radio Metropolitan Area Network), and the IEEE 802.16 standard in its various versions (802.16a, 802.16b, 802.1GRevd, 802.16e, etc.), also known as WiMAX (Worldwide Interoperability for Microwave Access) technology, or the integration between a radio-mobile systems and a WPAN network (Wireless Personal Network Area) such as those compliant with the Bluetooth standard or the IEEE 802.15 standard in its various versions (802.15.1, 802.15.2, etc).

The operation of changing the modules of the "Radio Dependent Technology" portion, allows to simulate integration with a wired-type radio-mobile system such as e.g. XDSL.

BRIEF DESCRIPTION OF THE ANNEXED DRAWINGS

The invention will now be described, by way of example only, with reference to the enclosed figures of drawing, wherein.

Figure 1:
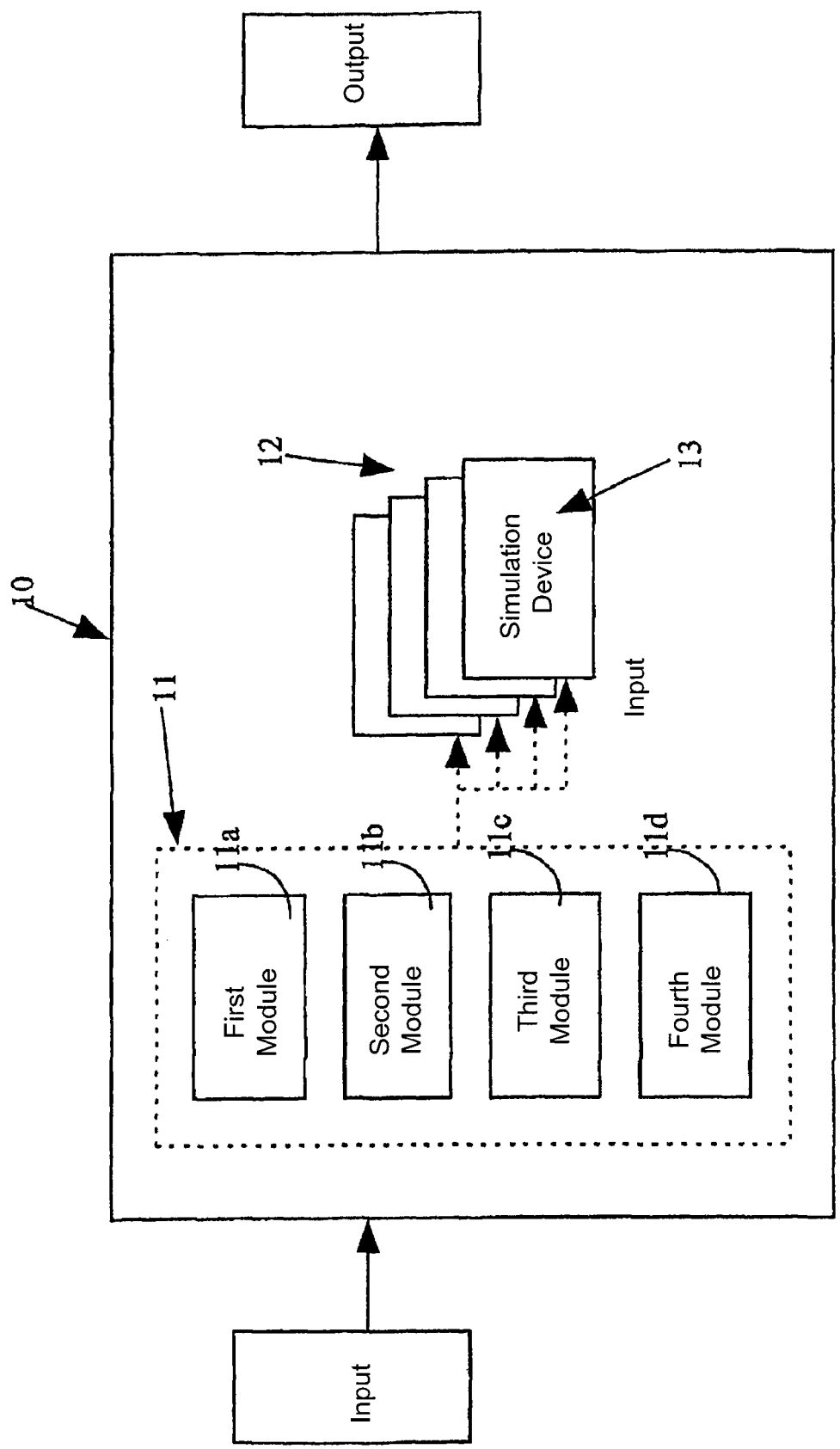
FIG. 1 shows an exemplary simulator architecture as described herein.
Figure 3A:
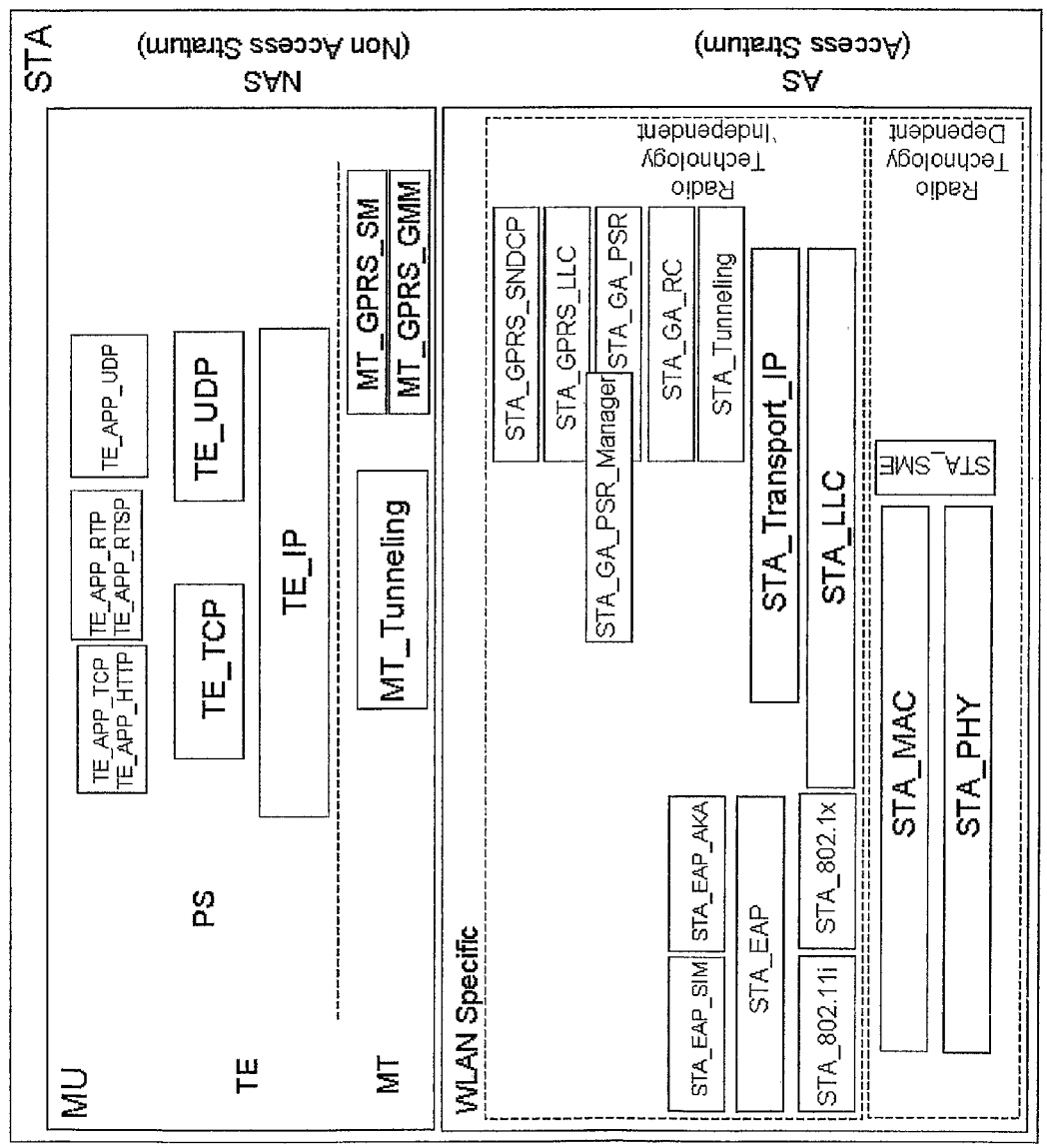
Figure 3B:
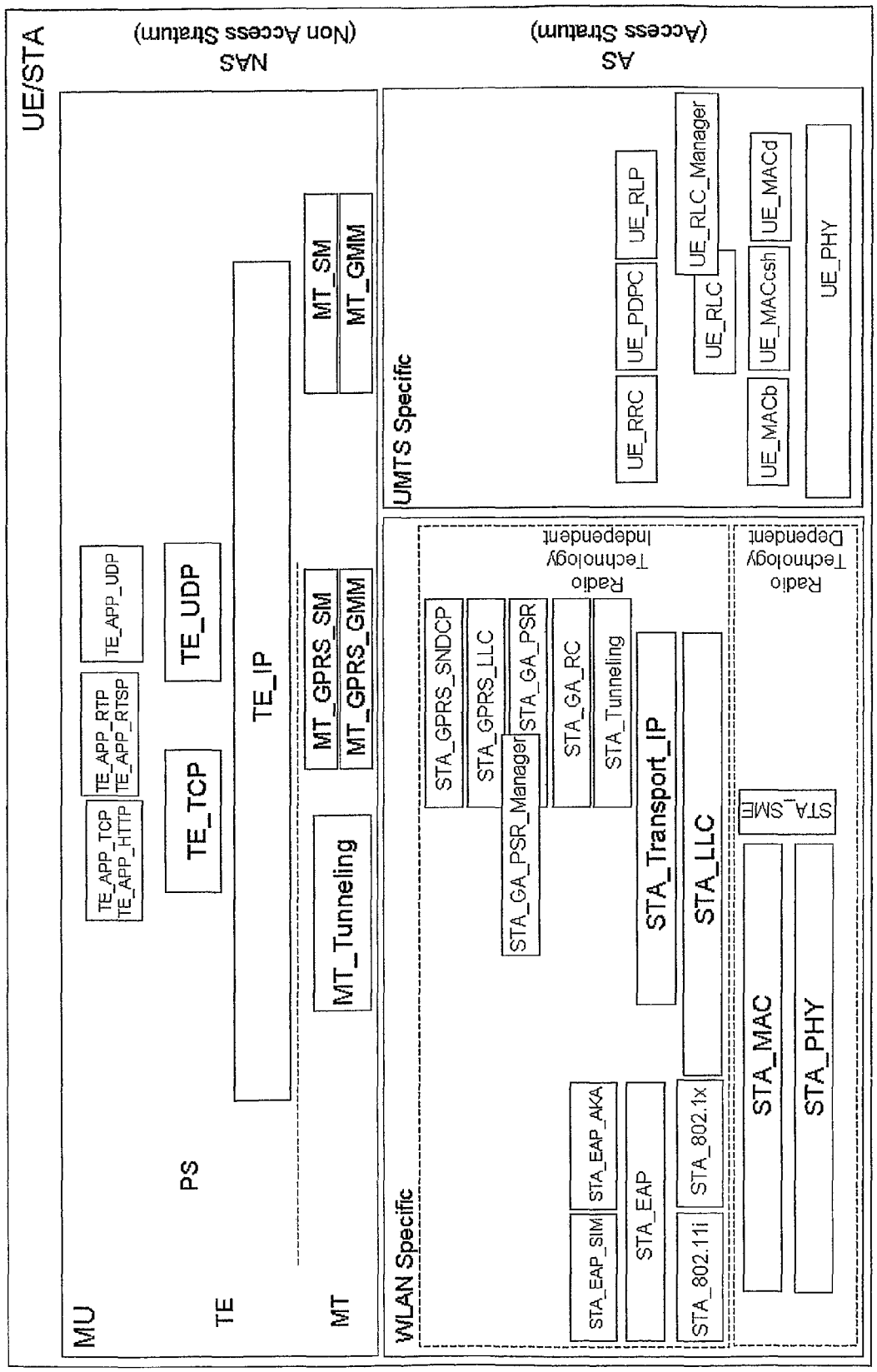
Figure 3C:
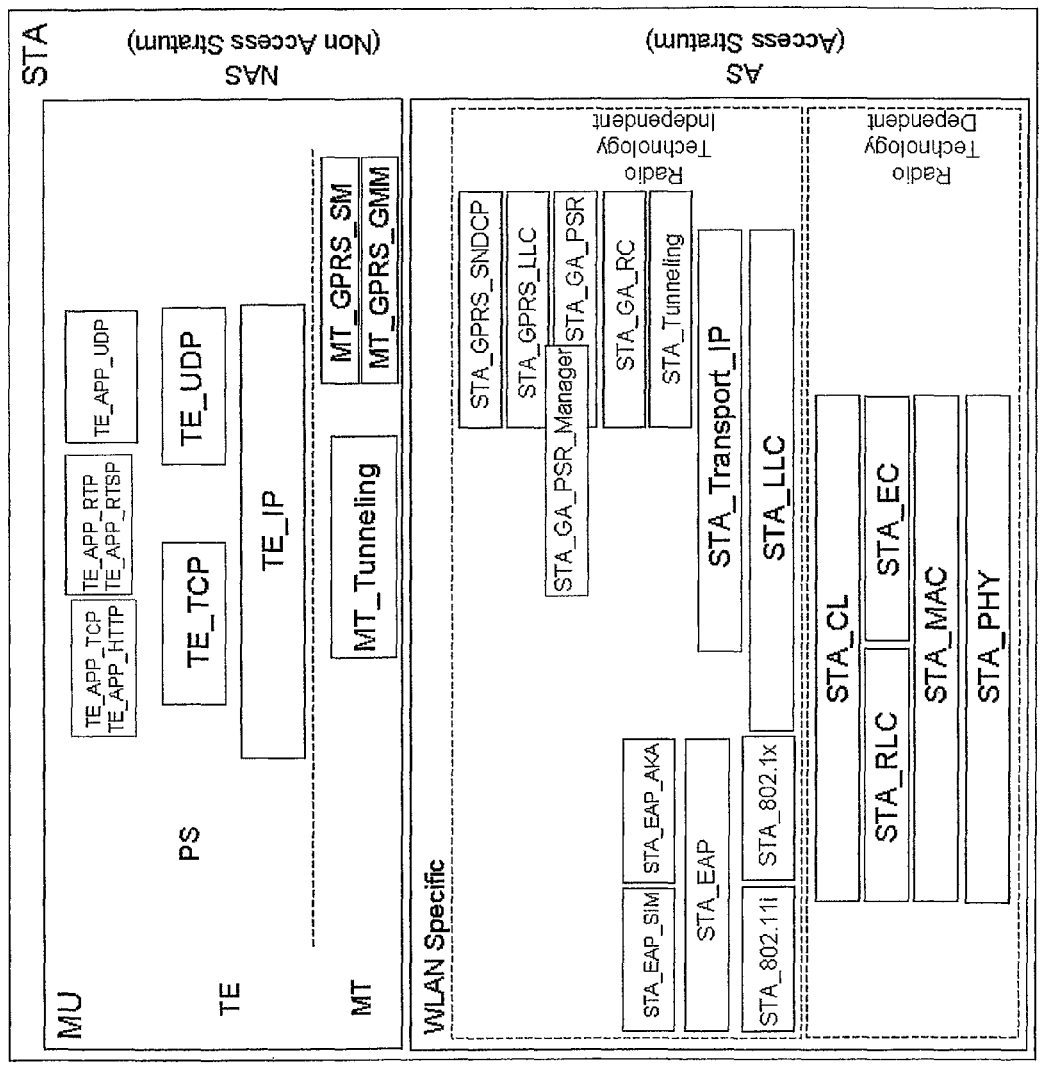
Figure 4A:
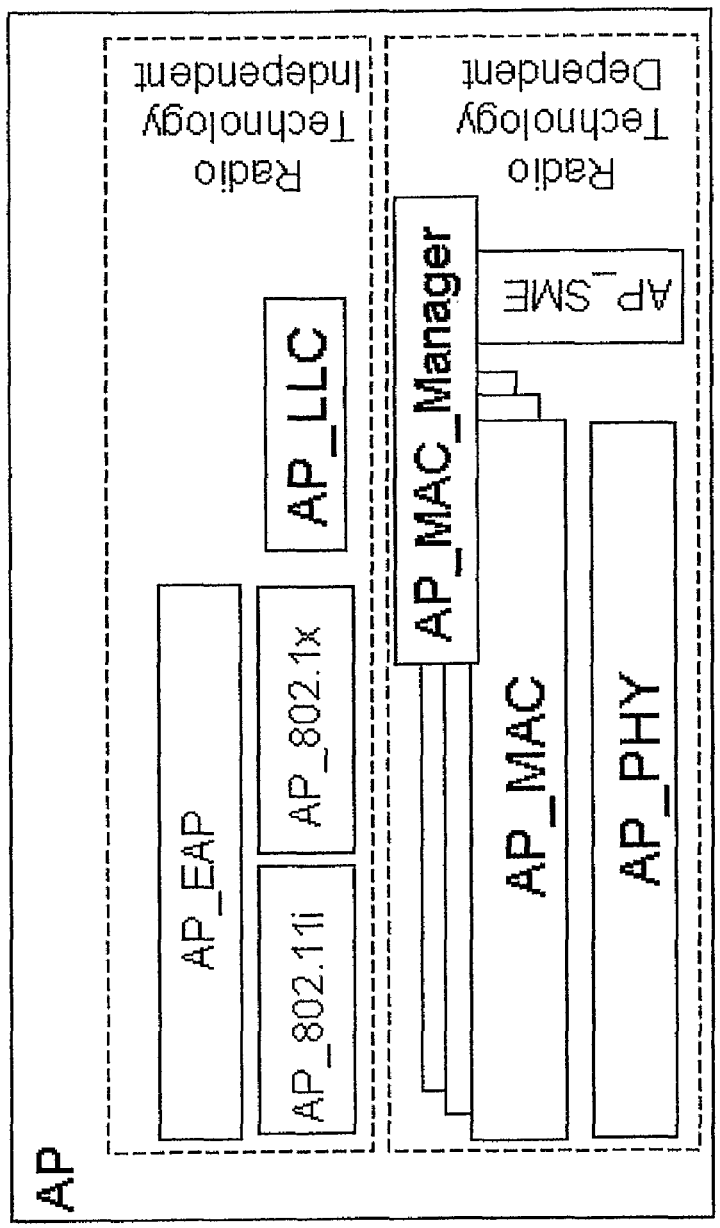
Figure 4B:
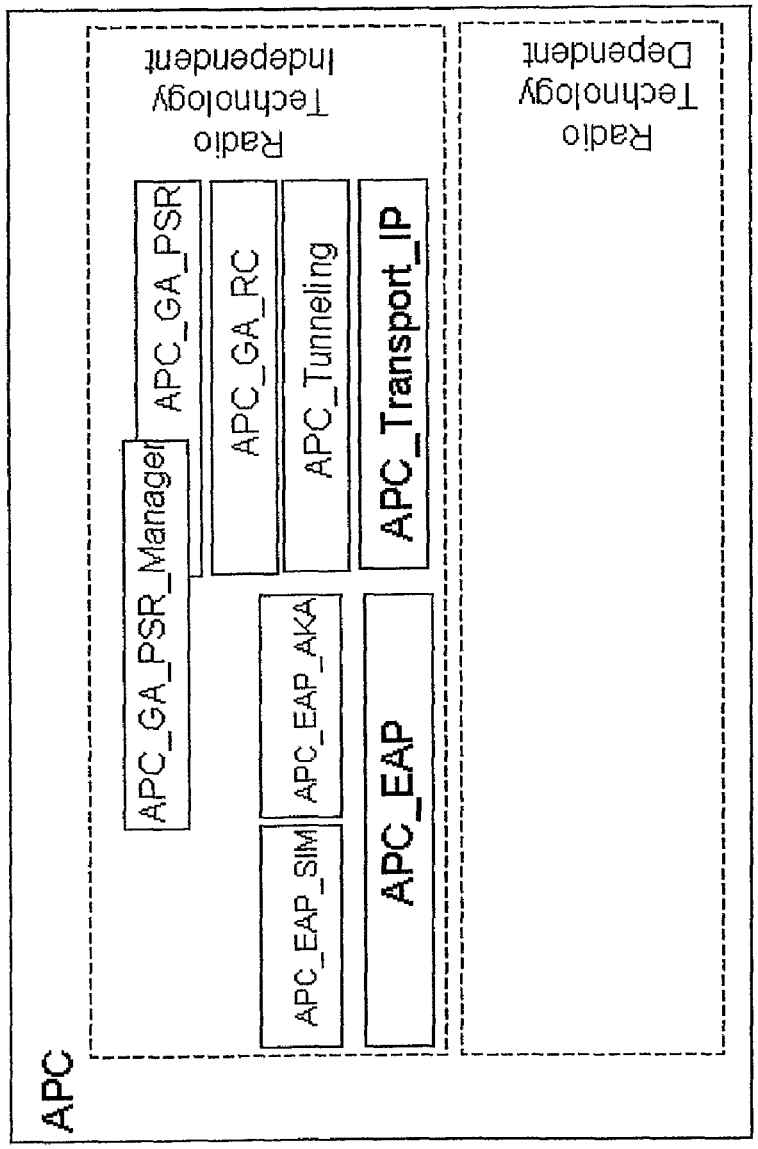
Figure 6:
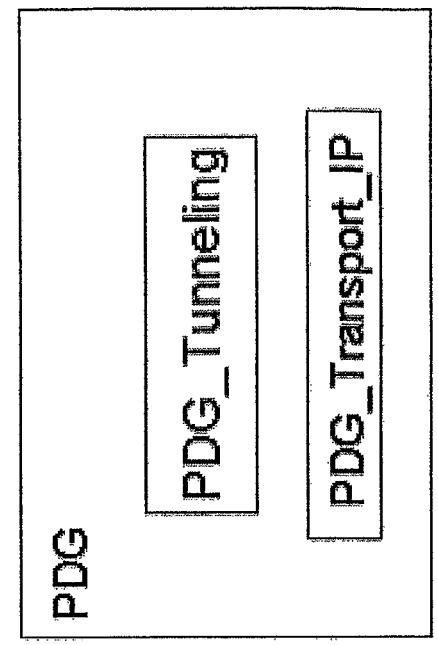
Figure 5:
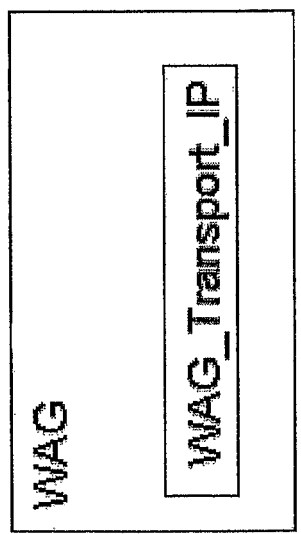
Figure 8:
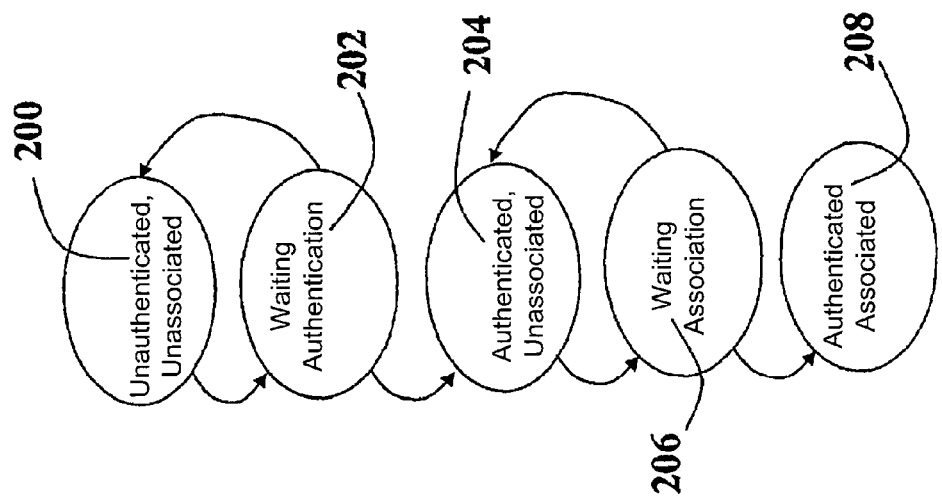
Figure 9:
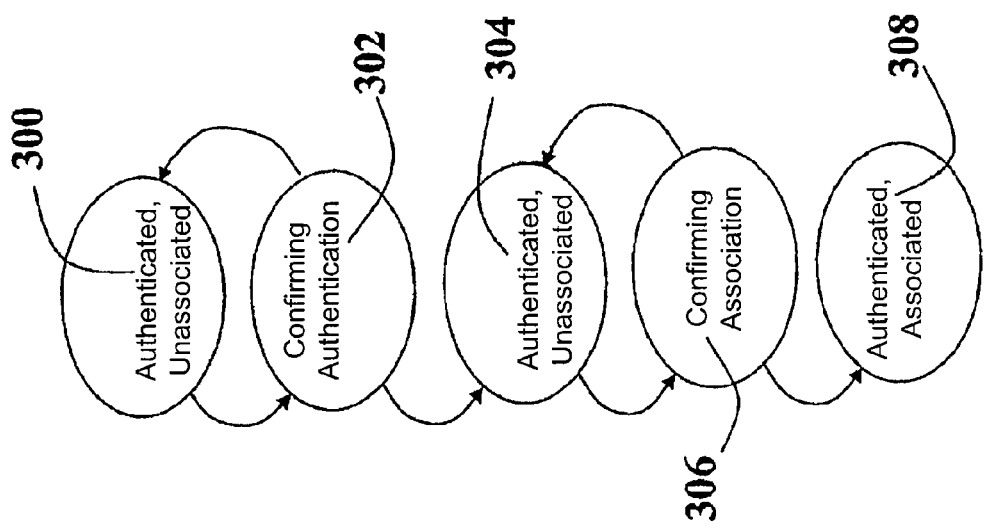
Figure 10:
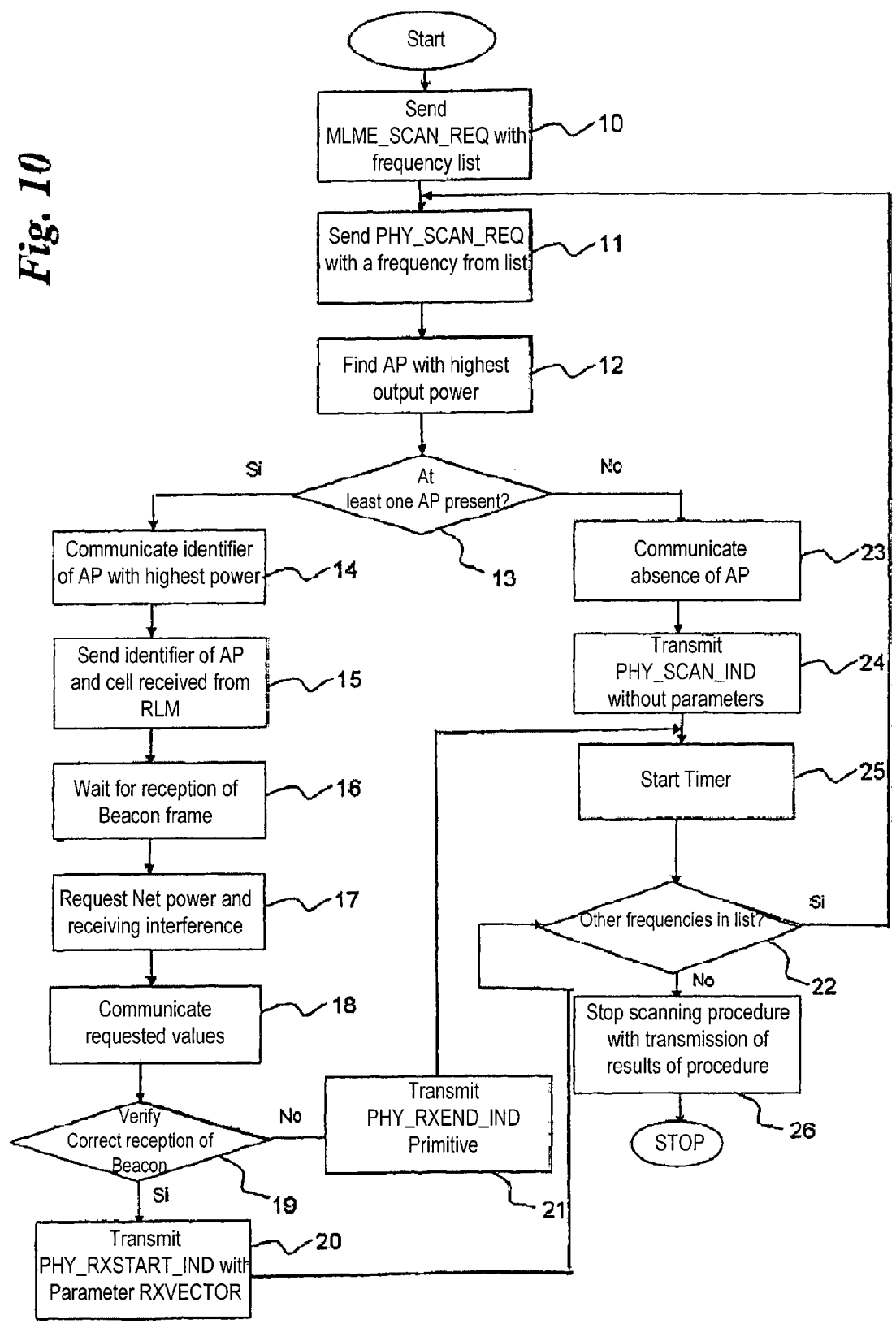
Figure 11:
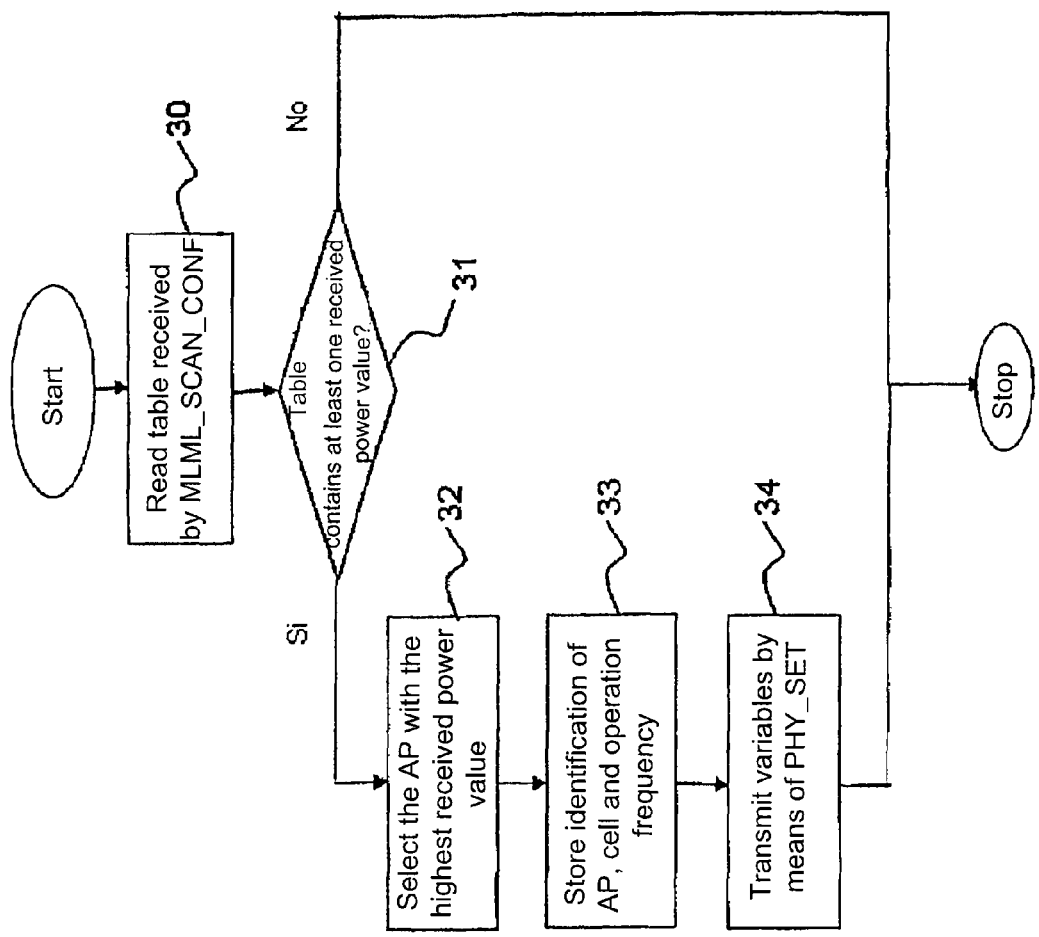

FIGS. 3A to 3C, and 4A-4B show, again in the form of protocol stacks, the implementation of different simulation architectures according to the solution described herein, FIG. 5 shows an exemplary architecture of the WAG device comprised in the simulator architecture of FIG. 1, FIG. 6 shows an exemplary architecture of the PDG device comprised in the simulator architecture of FIG. 1, FIGS. 7 through 9 show, in the form of a so-called state-machine or "automaton", operation of different modules of the simulator architecture, FIGS. 10 and 11 are flow-charts showing typical criteria of operation of modules comprised in the simulator architecture.

DETAILED DESCRIPTION OF PREFERRED EMBODIMENTS OF THE INVENTION

The block diagram of FIG. 1 illustrates a simulator 10 as described herein. Such a simulator can be implemented, for instance, on a computer such as a personal computer (PC) equipped with an Intel Pentium III processor and a Microsoft Windows operating system, using Microsoft Visual Studio 6.0/.Net development environment and ANSI C++ programming language.

However, the simulator 10 can be implemented with any type of computer, including personal computers equipped with standard processors (Intel, SUN, Apple) and operating system (Windows, Linux, Unix, MAC OS), by using current programming languages such as ANSI C++ (a currently preferred choice), Java, Delphi, or Visual Basic. The ANSI C++ language is a currently preferred choice in view of the good programming flexibility offered and of the high performance level, especially in terms of execution speed.

The simulator operates on a set of input signals I to produce a set of output signals O and is based on a so-called "object approach".

According to the object-based approach, the basic unit of decomposition is the object, intended as an aggregation of variable, data structures and procedures, within the scope of the simulator, like a single entity. Here, a communication network is described by an object-based architecture wherein each single object represents the model of a real network device. Such simulators include modules or devices adapted to simulate the behaviour of physical network devices.

The architecture of the simulator 10 thus comprises:

a simulation engine 11 responsible for the management and evolution of the simulation; and a package device 12, including a plurality of simulation devices designated as 13, each representative of a physical device of the simulated network and the objects related to the simulation scenario.

In greater detail, the simulation engine 11 comprises the following modules:

a first module 11a, implemented for example in a similar way to the "Parameters manager" module described in WO-A-02/104055, which reads and interprets network configuration parameters contained in a configuration file (which represents an input to the simulator 10) and makes this information available for the creation of the simulation devices in the initialization step of the simulation;

a second module 11b, acting as an event scheduler, implemented for example in a similar way to the "Event Scheduler" module described in WO 02/104055, which establishes the sequence of execution of the simulation steps;

a third module 11c, implemented for example in a similar way to the "Factory Manager" module described in WO-A-02/104055, which optimizes the memory allocation of the simulation devices;

a fourth module lid, implemented for example in a similar way to the "Statistic Manager" module described in WO-A-02/104055, which manages modules for collecting and processing the simulation results.

Further, each simulation device 13 comprises different modules, relating to the different functionalities managed by the device itself.

Specifically, the simulator architecture considered herein comprises a set of modules that allow to simulate, in a separated way, either users with mobile terminal of the WLAN-type (briefly referred as "WLAN users" in the following) or users with mobile terminal of the GSM/GPRS/EDGE/UMTS-type (briefly referred as "GSM/GPRS/EDGE/UMTS users" in the following).

Moreover, the simulator architecture considered herein allows to simulate users with integrated terminal that allows the users to change the radio access system through which the various services are provided, passing therefore from WLAN systems to GSM/GPRS/EDGE/UMTS systems or viceversa, accordingly to various factors, e.g., the type of service requested by the user, the Quality of Service requirement demanded from the user, the state of the networks (WLAN and cellular) in terms of number of connected users, traffic to get over, billing typology, etc.

Figure 2:
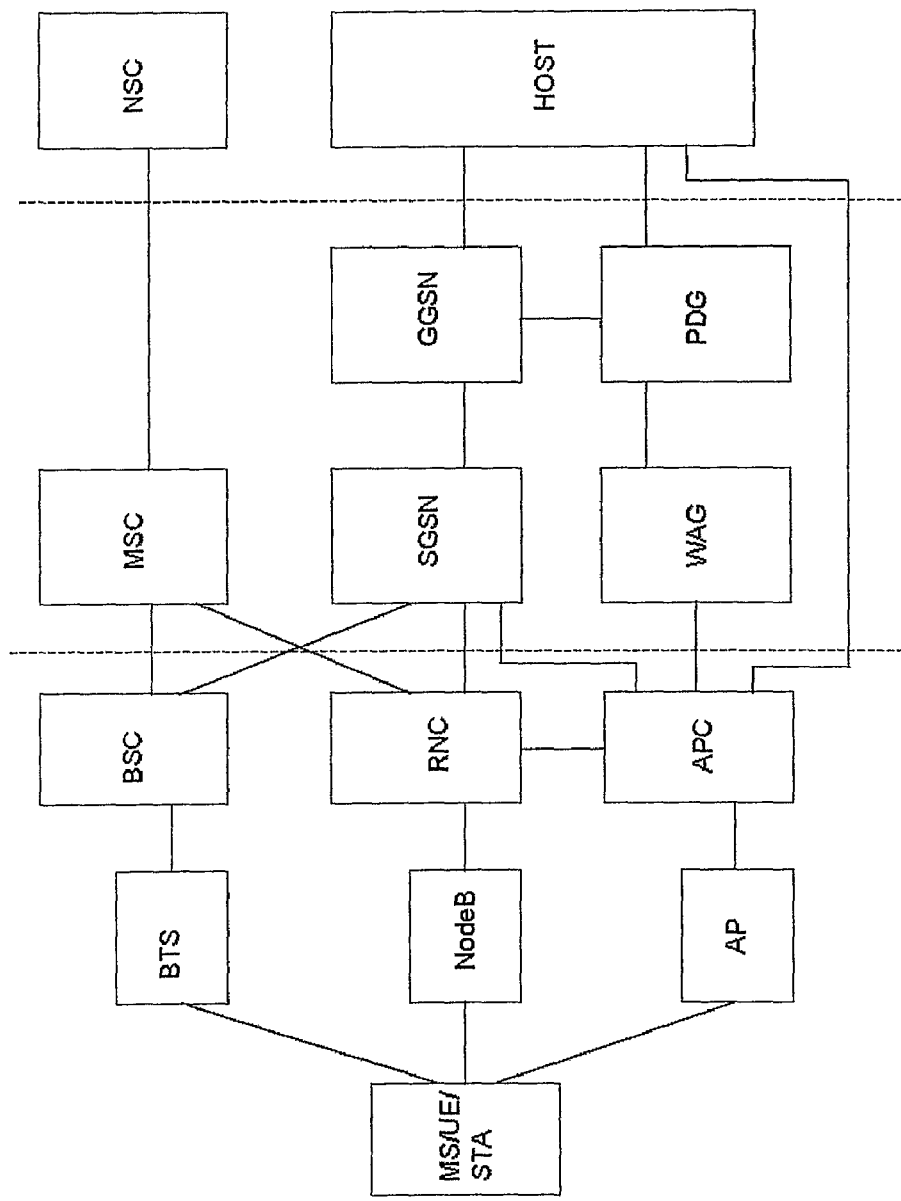
FIG. 2 shows an exemplary context of utilization of the simulator of FIG. 1.

FIG. 2 shows the objects contained in the simulator architecture that allow simulation of the integration between a WLAN system and a cellular radio-mobile system.

In particular, the simulator architecture comprises the following devices:

a) a MS/UE/STA user terminal (Mobile Station/User Equipment/STAtion): it represents a mobile terminal with a WLAN radio interface.

As indicated, the mobile terminal can be of three different types, according to the kind of interface owned, and in particular can be:

a WLAN "single mode" terminal: terminal equipped with a single WLAN interface, briefly referred as STA;

a WLAN "dual mode" terminal: terminal equipped with a WLAN interface and a GSM/GPRS/EDGE interface (briefly referred as MS/STA) or with a WLAN interface and an UMTS interface (briefly referred as UE/STA);

a multimode terminal: terminal equipped with a WLAN interface, a GSM/GPRS/EDGE interface and an UMTS interface (briefly referred as MS/UE/STA);

b) a WLAN access device: AP (Access Point) and APC (Access Point Controller);

c) a WLAN Core Network device for PS (Packet Switched) services offered through the WLAN: WAG (Wireless Access Gateway) and PDG (Given Packet Gateway). The WAG device performs the IP router function and executes the routing of the IP packets exchanged between the APC/APCs of the WLAN access network/s and the PDG of the WLAN Core Network, while the PDG device terminates both the IP protocol in the Core Network and the Tunnelling protocol with the STA terminal.

The modules comprised in the previous devices will be further described in the following.

Moreover, FIG. 2 shows the devices comprised in the cellular radio-mobile system GSM/GPRS/EDGE/UMTS, that allow to simulate the different integration modalities.

In particular, the simulator architecture comprises:
GSM/GPRS/EDGE network access devices: BTS (Base Transceiver Station) and BSC (Base Station Controller);
UMTS network access devices: Node B and RNC (Radio Network Controller);
Core Network devices used for Circuit Switched (CS) services: MSC (Mobile Switching Centre);
Core Network devices used for Packet Switched (PS) services: SGSN (Serving GPRS Support Node) and GGSN (Gateway GPRS Support Node).

Additionally, FIG. 2 shows devices of the fixed network for the Circuit Switched (CS) services, such as the NSC (Network Switching Centre), and for the Packet Switched (PS) services, such as the HOST, that simulate the end-point of the WLAN and cellular users traffic.

Further details and an exhaustive description of the modules that are comprised either in the cellular radio-mobile devices or in the fixed network devices can be found in WO-A-2005/060293.

As indicated, the simulator architecture of FIG. 2, and the devices comprised therein, allow to simulate the following macro-scenarios:

a) a WLAN system interconnected to a radio-mobile system by means of the so-called "loose coupling" modality;
b) a WLAN system interconnected to a radio-mobile system by means of the so-called "tight coupling" modality; and
c) a stand-alone WLAN system.

In the "loose coupling" modality case (macro-scenario a), the architecture implemented in the simulator allows to simulate the interconnection scenarios defined in the ambit of the 3GPP (Third Generation Partnership Project) and illustrated in document TR 22.934 "3rd Generation Partnership Project; Technical Specification Group Services and System Aspects; Feasibility study on 3GPP system to Wireless Local Area Network (WLAN) interworking (Release 6)".

In this case the possible scenarios are the following:

a1) scenario 1—Common billing and Customer Care: in this scenario only the billing and the customer care operations are integrated in the two networks; in this case a WLAN user, that is also a subscriber of the cellular radio-mobile services, receives only one bill for both the services and can make use of an unique customer care service;

a2) scenario 2—3GPP system based Access Control and Charging: in this scenario the AAA (Authentication, Authorization and Accounting) procedure, that comprises the authentication of the WLAN user, the access authorization to the network given at the WLAN user, and the accounting of the traffic generated by the WLAN user, is executed by elements of the cellular radio-mobile system, for example by the SIM/USIM module;

a3) scenario 3—Access to 3GPP PS (Packet Switched) Services: in this scenario the WLAN users are able to access to the 3G packet switched services like the normal user of the cellular radio-mobile system under consideration; every WLAN user can utilize the same packet switched services utilized by the cellular radio-mobile system users;

a4) scenario 4—Service Continuity: in this scenario the WLAN users are able to access, with continuity, to the 3G packet switched services; the WLAN users do not need to restarting the current session during the roaming operations from the WLAN system to the cellular radio-mobile system, and viceversa;

a5) scenario 5—Seamless services: in this scenario the WLAN users are transparent to the roaming operations; the packet loss and the packet delay are minimized; and a6) scenario 6—Access to 3GPP CS (Circuit Switched) Services: in this scenario the WLAN user are able to access to the 3G circuit switched services like the normal user of the cellular radio-mobile system under consideration; every WLAN user can utilize the same circuit switched services (i.e. the voice traffic) utilized by the cellular radio-mobile system users.

With regard to the "tight coupling" modality case no further scenarios are provided.

The simulator architecture of FIG. 2 can be adapted to simulate:

a WLAN system interconnected with a cellular radio-mobile system by means of the "loose coupling," modality (macro-scenario a)) in which:
in the Scenario 1 (a1) and Scenario 2 (a2) cases, the APC device is directly interconnected to the HOST device;
in the other cases, the WAG device and the PDG device are utilized as middle devices between the APC device and the HOST device, and the PDG device is interconnected to the GGSN device;

a WLAN system interconnected with a cellular radio-mobile system by means of the "tight coupling" modality (macro-scenario b)) in which the APC device is interconnected to the SGSN device (Serving GPRS Support Node) and optionally to the RNC device (Radio Network Controller);

a WLAN stand-alone system (macro-scenario c)) in which the APC device is directly interconnected to the HOST device.

In particular, in the simulations of a stand-alone WLAN system (macro-scenario c) or of a WLAN system integrated with a cellular radio-mobile system (macro scenarios a) and b)), the simulator architecture allow to simulate a plurality of WLAN access networks, each of which comprising a plurality of AP devices and a APC device. The different WLAN access networks can be configured with the same identifier (Network Name or Service Set IDentifier, SSID) or with different identifier in order to allow or not the handover between the different networks. All the scenarios comprise a HOST device, differently connected accordingly to the type of scenarios, which simulates the several end-points of the customer traffic.

FIG. 3A shows the STA device architecture implemented in the simulator described herein. In particular, the STA device comprises a MU (Mobile Unit) portion, common to all the access technologies, including the application protocols in the TE (Terminal Equipment) sub-portion, and the Core Network protocols in the MT (Mobile Terminal) sub-portion.

The STA device further comprises a specific portion adapted to access the WLAN technologies (referred as WLAN Specific in the following) including the access protocols adapted for the WLAN networks.

More in details, the MU portion comprises a TE sub-portion in which there are comprised the application modules (TE_APP_TCP, TE_APP_HTTP, TE_APP_UDP, TE_AP_RTP, TE_APP_RTSP, TE_TCP, TE_UDP, TE_IP, all of these described in detail in WO-A-2005/060293), and a MT sub-portion in which there are comprised the Core Network modules, that will be described in details in the following. The Core Network modules are adapted to realize the integration of the WLAN systems with the cellular radio-mobile systems.

The WLAN Specific portion is in turn divided into two sub-portions:
- a sub-portion common to all the WLAN radio technologies adapted to allows the integration of the WLAN systems with the cellular radio-mobile systems (the Radio Technology Independent block in FIG. 3A), and
- a sub-portion dependent on the particular WLAN radio technology supposed to be simulated (the Radio Technology Dependent block in FIG. 3A).

The subdivision of the specific WLAN access block in two sub-portions, provides a flexible simulator adapted to simulate the integration of other WLAN technologies and cellular radio-mobile systems.

The Core Network modules adapted to the integration of the WLAN systems with the cellular radio-mobile systems, included in the MT portion, are the following:

MT_Tunnelling—the MT_Tunnelling module simulates the Tunnelling protocol based on IPsec, that allows the mutual authentication between the MT portion and the PDG device, the ciphering of the data and the integrity control. Document TS 24.234 "$3^{rd}$ Generation Partnership Project; Technical Specification Group Core Network and Terminals; 3GPP system to Wireless Local Area Network (WLAN) interworking; User Equipment (UE) to network protocols; Stage 3 (Release 6)" defines the Tunnelling protocol;

MT_GPRS_SM—the MT_GPRS_SM module simulates the SM protocol (Session Management) as defined in the MT_SM module described in WO-A-2005/060293;

MT_GPRS_GMM—the MT_GPRS_GMM module simulates the GMM protocol (GPRS Mobility Management) as defined in the MT_GMM module described in WO-A-2005/060293.

The specific access modules to the WLAN system independent by the particular WLAN radio technology to be simulated, included in the "Radio Technology Independent" block, are the following:

STA_LLC—the STA_LLC module simulates the LLC level (Logical Link Control) of a WLAN terminal compliant with the standard "(ISO/IEC 8802-2:1998), IEEE Standard for Information technology—Telecommunications and information exchange between systems—Local and metropolitan area networks—Specific requirements—Part 2: Logical Link Control" common to all the standard belonging to the 802 family;

STA_Transport_IP—the STA_Transport_IP module simulates the IP protocol in the WLAN access network, as specified by IETF and described in document RFC791, "Internet Protocol";

STA_Tunnelling—the STA_Tunnelling module simulates the Tunnelling protocol based on IPsec, that allows the mutual authentication between the STA and the APC device, the ciphering of the data and the integrity control. Document TS 43.318 "3rd Generation Partnership Project; Technical Specification Group GSM/EDGE Radio Access Network; Generic access to the A/Gb interface; Stage 2 (Release 6)" defines the STA_Tunnelling protocol;

STA_GA_RC—the STA_GA_RC module simulates the GA-RC protocol (Generic Access—Resource Control) that performs the IP connection management. Document TS 44.318 "3rd Generation Partnership Project; Technical Specification Group GSM/EDGE Radio Access Network Generic Access (GA) to the A/Gb interface; Mobile GA interface layer 3 specification (Release 6)" defines the GA-RC protocol;

STA_GA_PSR and STA_GA_PSR_Manager—the STA_GA_PSR module simulates the GA-PSR protocol (Generic Access—Packet Switched Resources) that performs the packet data transmission through the below IP tunnelling. The functionalities of this protocol are similar to the functionalities of the RLC protocol included in the MS GPRS portion and defined in WO-A-2005/060293. The STA_GA_PSR_Manager module, instead, manages the installation of the single STA_GA_PSR modules. Document TS 44.318 "3rd Generation Partnership Project; Technical Specification Group GSM/EDGE Radio Access Network Generic Access (GA) to the A/Gb interface; Mobile GA interface layer 3 specification (Release 6)" defines the STA_GA_PSR protocol;

STA_GPRS LLC—the STA_GPRS_LLC module simulates the LLC protocol (Logical Link Control) that performs the establishment of the logical connection for the data transfer between the STA and the SGSN node. Such a module corresponds to the MS_LLC module included in the MS GSM/GPRS portion and defined in WO-A-2005/060293. This module dialogues with the SGSN_LLC module included in the SGSN node and described in WO-A-2005/060293.

STA_GPRS_SNDCP—the STA_GPRS_SNDCP module simulates the SNDCP protocol (SubNetwork Dependent Convergence Protocol) that performs the features mapping of the different network levels on the below LLC module. Such a module corresponds to the MS_SNDCP included in the MS GSM/GPRS portion and defined in WO-A-2005/060293. This module dialogues with the SGSN_SNDCP module included in the SGSN node and described in WO-A-2005/060293.

STA_802.1x—the STA_802.1x module simulates the IEEE 802.1x protocol, utilized for the transport on IEEE 802-type networks of the EAP protocol messages. Document "IEEE Std 802.1X™-2004—IEEE Standard for Local and metropolitan area networks—Port-Based Network Access Control" describes the IEEE 802.1x protocol;

STA_802.11i—the STA_802.11i module simulates the IEEE 802.11i protocol, utilized for the transport on IEEE 802.11-type networks of the EAP protocol messages. Document "IEEE 802.11i-2004 Amendment to IEEE Std 802.11, 1999 Edition (Reaff 2003). IEEE Standard for Information technology—Telecommunications and information exchange between systems—Local and metropolitan area networks—Specific requirements—Part 11: Wireless LAN Medium Access Control (MAC) and Physical Layer (PHY) specifications—Amendment 6: Medium Access Control (MAC) Security Enhancements" describes the IEEE 802.11 protocol;

STA_EAP—the STA_EAP module simulates the EAP protocol specified by IETF and described in document RFC3748, B. Aboba, L. Blunk, J. Vollbrecht, J. Carlson, H. Levkowetz; "Extensible Authentication Protocol (EAP)". The EAP protocol provides the transport from the STA to the APC, through the AP, of the messages belonging to authentication protocols of higher level (e.g. EAP-AKA or EAP-SIM);

STA_EAP_AKA—the STA_EAP_AKA module simulates the EAP-AKA authentication protocol specified by IETF and described in document draft-arkko-pppext-eap-aka-15.txt, J. Arkko, H. Haverinen, "Extensible Authentication Protocol Method for 3rd Generation Authentication and Key Agreement (EAP-AKA)"; such a protocol provides a mechanism for authentication and session key distribution using the Authentication and Key Agreement (AKA) mechanism used in the 3rd generation mobile networks Universal Mobile Telecommunications System (UMTS). AKA protocol is based on symmetric keys, and runs typically in a Subscriber Identity Module (UMTS Subscriber Identity Module USIM, or (Removable) User Identity Module (R)UIM);

STA_EAP_SIM—the STA_EAP_SIM module simulates the EAP-SIM authentication protocol specified by IETF and described in document draft-haverinen-pppext-eap-sim-16.txt, H. Haverinen, J. Salowey, "Extensible Authentication Protocol Method for GSM Subscriber Identity Modules (EAP-SIM)"; such a protocol provides a mechanism for authentication and session key distribution using the Global System for Mobile Communications (GSM) Subscriber Identity Module (SIM). The EAP-SIM mechanism specifies enhancements to GSM authentication and key agreement whereby multiple authentication triplets can be combined to create authentication responses and session keys of greater strength than the individual GSM triplets.

The user of the simulator, by means of an input file, carries out the selection of the protocols IEEE 802.1x or IEEE 802.11i and EAP_AKA or EAP_SIM supposed to be utilized in the implementation. The IEEE 802.1x protocol is however included as default when simulation with STA not consistent with the IEEE 802.11 standard are performed.

The specific access modules to the WLAN system dependent by the particular WLAN radio technology to be simulated, included in the "Radio Technology Dependent" block, are the following:

STA_MAC—the STA_MAC module simulates the MAC level (Medium Access Control) of a WLAN terminal compliant with the IEEE 802.11 standard defined in document "(ISO/IEC 8802-11: 1999) IEEE Standards for Information Technology—Telecommunications and Information Exchange between Systems—Local and Metropolitan Area Network—Specific Requirements—Part 11: Wireless LAN Medium Access Control (MAC) and Physical Layer (PHY) Specifications". The arrangement described herein is independent from the specific implementation of the MAC protocol performed in the STA_MAC module, and than it can be different, in one or more points, with respect to the aforesaid standard; Of course, the MAC implementation is supposed to be interoperable with the standard. The STA_MAC module can comprise also the MLME level (MAC Layer Management Entity) functionalities, defined in the previous document;

STA_PHY—the STA_PHY module simulates the behaviour of the PHY level (PHYsical) of a WLAN terminal compliant with the IEEE 802.11 standard in its various versions, listed in the following:

IEEE 802.11b-1999 Supplement to 802.11-1999, Wireless LAN MAC and PHY specifications: Higher speed Physical Layer (PHY) extension in the 2.4 GHz band;

IEEE 802.11a-1999 (8802-11:1999/Amd 1:2000(E)), IEEE Standard for Information technology—Telecommunications and information exchange between systems—Local and metropolitan area networks—Specific requirements—Part 11: Wireless LAN Medium Access Control (MAC) and Physical Layer (PHY) specifications—Amendment 1: High-speed Physical Layer in the 5 GHz band;

IEEE 802.11g-2003 IEEE Standard for Information technology—Telecommunications and information exchange between systems—Local and metropolitan area networks—Specific requirements—Part 11: Wireless LAN Medium Access Control (MAC) and Physical Layer (PHY) specifications—Amendment 4: Further Higher-Speed Physical Layer Extension in the 2.4 GHz Band.

Also in this case, the PHY implementation performed in the STA_PHY module can be different with respect to the aforesaid standards. Of course, the PHY implementation is supposed to be interoperable with the aforesaid standards. The STA_PHY module can comprise also the PLME level (Physical Layer Management Entity) functionalities, defined in the three previous documents;

STA_SME—the STA_SME module simulates the behaviour of the SME device (Station Management Entity) of a WLAN terminal compliant with the IEEE 802.11 standard. The operation of this block is specified in the standard only with reference to the messages (called "services primitive") exchanged with MAC level and with the PHY level. Every type of implementation of the STA_SME module can be provided in the simulator architecture. Specifically, the STA_SME implementation is adapted to correctly perform the following operations:

initialization of the STA;

scanning of the frequency channels in order to find out the channel including the Access Point to be used for the communications;

selecting the AP, among the plurality of AP carried out during the scanning operation, on the basis of, e.g., the power received by the STA and measured on the signals transmitted by each AP;

executing the reset of the STA when a system-block occurs or in the case of system failure;

selecting the optimal transmission rate to transmit the packets to the AP on the basis of, e.g., the channel quality (rate switching);

handover, that is the Access Point exchange, when e.g. the signal coming from another AP has a power greater than the one currently received, or when the power of the received signal falls down to a pre-defined threshold;

implementation of the TPC (Transmit Power Control) and DFS (Dynamic Frequency Selection) functionalities according to the requirements of the IEEE 802.11h-2003 standard, "IEEE Standard for Information technology—Telecommunications and Information Exchange Between Systems—LAN/MAN Specific Requirements—Part 11: Wireless LAN Medium Access Control (MAC) and Physical Layer (PHY) Specifications: Spectrum and Transmit Power Management Extensions in the 5 GHz band in Europe".

The Core Network modules previously described are not supposed to be utilized all together contemporarily, but are included in the simulation on the basis of the interconnection modality and scenario to be simulated. In particular:

the simulation of a WLAN system interconnected with the cellular radio-mobile system by means of the so-called "loose coupling" modality (macro-scenario a)) requires:

no modules for the scenario 1 and the scenario 2 as the user traffic is directly sent from the APC device to the HOST;

the MT_Tunnelling module for the scenarios 3 to 6 in order to send to the HOST the WLAN users traffic by means of the WAG and the PDG;

the simulation of a WLAN system interconnected with the cellular radio-mobile system by means of the so-called "tight coupling" modality (macro-scenario b)) requires the MT_GPRS_SM and MT_GPRS_GMM modules, so the WLAN access network can utilize the Core Network of the cellular radio-mobile system;

the simulation of a stand-alone WLAN system (macro-scenario c) does not require any module because the user traffic is directly sent from the APC device to the HOST.

The modules included in the Radio Technology Dependent block, and previously described, are utilized in all the simulations whatever the macro-scenario related to the interconnection modality.

The modules included in the Radio Technology Dependent block are not supposed to be utilized all together simultaneously, but are included in the simulation on the basis of the interconnection modality and scenario to be simulated. In particular:

the simulation of a WLAN system interconnected with the cellular radio-mobile system by means of the so-called "loose coupling" modality (macro-scenario a)) requires:
the STA_LLC module for all the scenarios;
the STA_Transport IP module for the scenarios 3 to 6 in order to send to the HOST the WLAN users traffic by means of the WAG and the PDG;

the simulation of a WLAN system interconnected with the cellular radio-mobile system by means of the so-called "tight coupling" modality (macro-scenario b)) requires the STA_LLC, STA_Transport-IP, STA_Tunnelling, STA_GA_RC, STA_GA_PSR, STA_GA_PSR_Manager, STA_GPRS_LLC and STA_GPRS_SNDCP modules, so the WLAN access network can utilize the Core Network of the cellular radio-mobile system as an access radio-mobile cellular network;

the STA_802.1x, STA_802.11i, STA_EAP, STA_E-AP_AKA and STA_EAP SIM modules are optionally included in the simulation of the scenarios from point 4 to point 6 of the "loose coupling" interconnection modality, and in the "tight coupling" interconnection modality;

the simulation of a stand-alone WLAN system requires the STA_LLC module.

FIG. 3B shows the dual mode UE/STA terminal architecture equipped with a WLAN radio interface and a UMTS radio interface. The UE/STA includes all the previously described modules (see FIG. 3A) and modules specific for the UMTS radio interface, described e.g. in WO-A-2005/060293. Similarly, both the dual mode MS/STA terminal equipped with a WLAN radio interface and a GSM/GPRS/EDGE radio interface and the multimode MS/UE/STA terminal equipped with all the radio interfaces, are implemented.

These terminals are configured, by means of an input file of the simulator architecture, to produce/receive traffic through a single interface per-time or through different interfaces at the same time. In a preferred way, these terminals are configured to utilize one of the two (or three in the case of a multimode terminal) interfaces when different networks are geographically overlapped.

The simulator architecture is independent of the type of WLAN radio technology to be simulated, so, changing the modules of the Radio Dependent Technology block allow to simulate the integration of other radio technologies with the cellular radio-mobile systems for all the scenarios previously listed.

FIG. 3C shows the whole architecture of the STA device where the modules adapted to simulate the IEEE 802.11 standard protocols have been substituted by modules adapted to simulate the HIPERLAN Type 2 standard protocols.

The modules are the following:

STA_CL—the STA_CL module simulates the behaviour of the CL (Convergence Layer) layer of a WLAN terminal compliant with the HIPERLAN Type 2 standard defined in ETSI BRAN, TS 101 493-1, "Broadband Radio Access Network (BRAN); HIPERLAN Type 2; Packet based Convergence Layer; Part 1: Common Part" and ETSI BRAN TS 101 493-2, "Broadband Radio Access Network (BRAN); HIPERLAN Type 2; Packet based Convergence Layer; Part 2: Ethernet Service Specific Convergence Sublayer (SSCS)";

STA_RLC—the STA_RLC module simulates the RLC (Radio Link Control) level of a WLAN terminal compliant with the HIPERLAN Type 2 standard defined in ETSI BRAN, TS 101 761-2, "Broadband Radio Access Network (BRAN); HIPERLAN Type 2; Data Link Control (DLC) Layer; Part 2: Radio Link Control (RLC) sublayer";

STA_EC—the STA_EC module simulates the functionalities of Error Control (EC) of a WLAN terminal compliant with the HIPERLAN Type 2 standard defined in ETSI BRAN, TS 101 761-1, "Broadband Radio Access Network (BRAN); HIPERLAN Type 2; Data Link Control (DLC) Layer; Part 1: Basic Data Transport Functions";

STA_MAC—the STA_MAC module simulates the MAC level of a WLAN terminal compliant with the HIPERLAN Type 2 standard defined in ETSI BRAN, TS 101 761-1, "Broadband, Radio Access Network (BRAN); HIPERLAN Type 2; Data Link Control (DLC) Layer; Part 1: Basic Data Transport Functions";

STA_PHY—the STA_PHY simulates the behaviour of the PHY level of a WLAN terminal compliant with the HIPERLAN Type 2 standard defined in ETSI BRAN, TS 101 475, "Broadband Radio Access Network (BRAN); HIPERLAN Type 2; Physical (PHY) layer".

The communication among the different devices comprised in a device, e.g. the STA device, is performed by means of messages that represent the so-called "service primitives" defined in the previously listed standard. The format of these messages can be different with respect to the one defined in the standard. Some messages can be defined ex-novo with respect to the standard. For example, in a dual mode UE/STA terminal, the definition of messages supposed to be exchanged between the STA_SME and the UE_RRC modules, messages not provided by any standard, allow the implementation of Common Radio Resource Management (CRRM) procedures.

The architecture of the access devices (AP, Access Point, and APC, Access Point Controller) is described in the following. Only the module adapted to the integration and the interconnection of the WLAN systems with the cellular radio-mobile systems are described.

In particular, FIG. 4A shows an exemplary architecture of an AP device. The architecture of FIG. 4A comprises a plurality of modules specific for the WLAN radio technology to be simulated. Such modules are included in the Radio Technology Dependent block. Furthermore, the architecture of FIG. 4A comprises some modules specific for the interconnection with the cellular radio-mobile systems included in the Radio Technology Independent block.

In particular, the AP modules independent from the WLAN radio technology to be simulated, included in the Radio Technology Independent block, are the following:

AP_LLC—the AP_LLC module simulates the LLC level (Logical Link Control) of the WLAN architecture and communicates with the STA_LLC module;

AP_802.1x—the AP_802.1x module simulates the IEEE 802.1x protocol, utilized for the transport on IEEE 802-type networks of the EAP protocol messages, and communicates with the STA_802.1x module;

AP_802.11i—the AP_802.11i module simulates the IEEE 802.11i protocol, utilized for the transport on IEEE 802.11i-type networks of the EAP protocol messages, and communicates with the STA_802.11i module;

AP_EAP—the AP_EAP module simulates the EAP protocol, providing the role of the so-called "authenticator" specified in the EAP standard, (RFC3748, B. Aboba, L. Blunk, J. Vollbrecht, J. Carlson, H. Levkowetz; "Extensible Authentication Protocol (EAP)"), and communicates with the STA_EAP module.

In particular, the modules dependent from the WLAN radio technology to be simulated, included in the Radio Technology Dependent block, are the following:

AP_MAC and AP_MAC_Manager—the AP_MAC module simulates the behaviour of the MAC level of an AP WLAN compliant with the IEEE 802.11 standard defined in "(ISO/IEC 8802-11: 1999) IEEE Standards for Information Technology—Telecommunications and Information Exchange between Systems—Local and Metropolitan Area Network—Specific Requirements—Part 11: Wireless LAN Medium Access Control (MAC) and Physical Layer (PHY) Specifications". With respect to what is defined in the previously cited standard, an AP comprises a plurality of AP_MAC modules, each of which simulates a radio cell identified by a CellId.

The insertion of the different AP_MAC modules, executed on the basis of the number of cells supposed to be simulated for every AP, is performed by an additional module not defined in the standard and called AP_MAC_Manager. The arrangement described herein is independent from the specific implementation of the MAC protocol performed in the AP_MAC module, and than it can be different, in one or more points, with respect to the aforesaid standard. Of course, the MAC implementation is supposed to be interoperable with the standard. The AP_MAC module can comprise also the MLME level (MAC Layer Management Entity) functionalities, defined in the previous document;

AP_PHY—the AP_PHY module simulates the behaviour of the PHY level (PHYsical) of a WLAN terminal compliant with the IEEE 802.11 standard in its various versions, listed in the following:

IEEE 802.11b-1999 Supplement to 802.11-1999, Wireless LAN MAC and PHY specifications: Higher speed Physical Layer (PHY) extension in the 2.4 GHz band; IEEE 802.11a-1999 (8802-11:1999/Amd 1:2000(E)), IEEE Standard for Information technology—Telecommunications and information exchange between systems—Local and metropolitan area networks—Specific requirements—Part 11: Wireless LAN Medium Access Control (MAC) and Physical Layer (PHY) specifications—Amendment 1: High-speed Physical Layer in the 5 GHz band;

IEEE 802.11g-2003 IEEE Standard for Information technology—Telecommunications and information exchange between systems—Local and metropolitan area networks—Specific requirements—Part 11: Wireless LAN Medium Access Control (MAC) and Physical Layer (PHY) specifications—Amendment 4: Further Higher-Speed Physical Layer Extension in the 2.4 GHz Band.

Also in this case, the PHY implementation performed in the AP_PHY module can be different with respect to the aforesaid standards. Of course, the PHY implementation is supposed to be interoperable with the aforesaid standards. The AP_PHY module can comprise also the PLME level (Physical Layer Management Entity) functionalities, defined in the three previous documents;

AP_SME—the AP_SME module simulates the behaviour of the SME device (Station Management Entity) of a WLAN terminal compliant with the IEEE 802.11 standard. The operation of this block is specified in the standard only with reference to the messages (called "services primitive") exchanged with MAC level and with the PHY level. Every type of implementation of the AP_SME module can be provided in the simulator architecture. Specifically, the STA_SME implementation is adapted to correctly perform the following operations:

initialization of the AP;

admission control, i.e. authorization or denial to the different STA to communicate with it;

executing the reset of the AP when a system-block occurs or in the case of system failure;

selecting the optimal transmission rate to transmit the packets to the AP on the basis of, e.g., the channel quality (rate switching);

load balancing by means of the disassociation of the exceeding STA;

implementation of the TPC (Transmit Power Control) and DFS (Dynamic Frequency Selection) functionalities according to the requirements of the IEEE 802.11h-2003 standard, "IEEE Standard for Information technology—Telecommunications and Information Exchange Between Systems—LAN/MAN Specific Requirements—Part 11: Wireless LAN Medium Access Control (MAC) and Physical Layer (PHY) Specifications: Spectrum and Transmit Power Management Extensions in the 5 GHz band in Europe".

When the modules of the Radio Technology Dependent block are realized with another WLAN technology, such as the HIPERLAN Type 2 technology, the modules adapted to simulate the IEEE 802.11 standard protocols are substituted by modules adapted to simulate the HIPERLAN Type 2 standard protocols.

FIG. 4B shows the APC architecture comprising the Radio Technology Dependent block and the Radio Technology Independent block. In the specific implementation here described, the Radio Technology Dependent block does not comprise any access module but its presence allows the simulation of other wireless technologies in which one or more access protocols of the Radio Technology Dependent block (for example the MAC protocol) can be splitted between the AP and the APC. The modules of the APC included in the Radio Technology Independent block are the following:

APC_Transport_IP—the APC_Transport_IP module simulates the IP protocol in the WLAN access network, as specified by IETF and described in document RFC791, "Internet Protocol", and communicates with the STA_Transport_IP module;

APC_Tunnelling—the APC_Tunnelling module simulates the Tunnelling protocol based on IPsec, that allows the mutual authentication between the STA and the APC device, the ciphering of the data and the integrity control. Document TS 43.318 "3rd Generation Partnership Project; Technical Specification Group GSM/EDGE Radio Access Network; Generic access to the A/Gb interface; Stage 2 (Release 6)" defines the Tunnelling protocol. This module communicates with the STA_Tunnelling module;

APC_GA_RC—the APC_GA_RC module simulates the GA-RC protocol (Generic Access—Resource Control) that performs the IP connection management. Document TS 44.318 "3rd Generation Partnership Project; Technical Specification Group GSM/EDGE Radio Access Network Generic Access (GA) to the A/Gb interface; Mobile GA interface layer 3 specification (Release 6)" defines the GA-RC protocol. This module communicates with the STA_GA_RC module;

APC_GA_PSR and APC_GA_PSR_Manager—the APC_GA_PSR module simulates the GA-PSR protocol (Generic Access-Packet Switched Resources) that performs the packet data transmission through the below IP tunnelling. The functionalities of this protocol are similar to the functionalities of the RLC protocol included in the MS GPRS portion and defined in WO-A-2005/060293. The APC_GA_PSR_ Manager module, instead, manages the installation of the single APC_GA_PSR modules. Document TS 44.318 "3rd Generation Partnership Project; Technical Specification Group GSM/EDGE Radio Access Network Generic Access (GA) to the A/Gb interface; Mobile GA interface layer 3 specification (Release 6)" defines the APC_GA_PSR protocol.

In the simulator architecture, the APC device plays also the role of the AAA server, i.e. the server adapted to execute the authentication and the authorization of the STA device and the accounting of the traffic. Thus, the APC comprises the following modules:

APC_EAP—the APC_EAP module simulates the EAP protocol specified by IETF and described in document RFC3748, B. Aboba, L. Blunk, J. Vollbrecht, J. Carlson, H. Levkowetz; "Extensible Authentication Protocol (EAP)". The EAP protocol provides the transport from the STA to the APC, through the AP, of the messages belonging to authentication protocols of higher level (e.g. EAP-AKA or EAP-SIM). This module communicates with the AP_EAP module;

APC_EAP_AKA—the APC_EAP_AKA module simulates the EAP-AKA authentication protocol specified by IETF and described in the document by J. Arkko, H. Haverinen, "Extensible Authentication Protocol Method for 3rd Generation Authentication and Key Agreement (EAP-AKA)"; such a protocol provides a mechanism for authentication and session key distribution using the Authentication and Key Agreement (AKA) mechanism used in the $3^{rd}$ generation mobile networks Universal Mobile Telecommunications System (UMTS). AKA protocol is based on symmetric keys, and runs typically in a Subscriber Identity Module (UMTS Subscriber Identity Module USIM, or (Removable) User Identity Module (R)UIM). This module communicates with the STA_EAP_AKA module;

APC_EAP_SIM—the APC_EAP_SIM module simulates the EAP-SIM authentication protocol specified by IETF and described in the document by H. Haverinen, J. Salowey, "Extensible Authentication Protocol Method for GSM Subscriber Identity Modules (EAP-SIM)"; such a protocol provides a mechanism for authentication and session key distribution using the Global System for Mobile Communications (GSM) Subscriber Identity Module (SIM). The EAP-SIM mechanism specifies enhancements to GSM authentication and key agreement whereby multiple authentication triplets can be combined to create authentication responses and session keys of greater strength than the individual GSM triplets. This module communicates with the STA_EAP_SIM module.

In order to simulate the scenario in which some of the STA devices utilize the EAP-SIM protocol and other devices utilize the EAP-AKA protocol, the APC_EAP_SIM and the APC_EAP_AKA are contemporary present in the same APC.

For sake of simplicity, the modules adapted to the execution of the protocols for the communication with the SGSN and eventually with the RNC (i.e. the APC_BSSGP module that simulates the BSSGP interface, protocol between the APC and the SGSN), are not shown even though they are present in the APC. These modules are essentially similar to those described in WO-A-2005/060293.

FIG. 5 shows the WAG device that in the simulator architecture plays the role of IP router, and executes the routing of the IP packets exchanged among the different APCs and the PDGs. The WAG device comprises a sole module, called WAG_Transport_IP adapted to simulate the IP protocol, and communicating with the APC_Transport_IP module and with the PDG_Transport_IP adapted to simulate, respectively, the IP protocol of the APC and PDG.

FIG. 6 shows the PDG device implemented in the simulator that terminates both the IP protocol inside the Core Network, via the PDG_Transport_IP module that communicates with the WAG_Transport_IP module, and the Tunnelling protocol with the STA via the PDG_Tunnelling module that communicates with the MT_Tunneling module.

In addition to the WLAN module previously described, according to the invention, the architecture of the simulator can contain other modules that perform supporting functions to the WLAN module to secure correct operation of this module. Currently are available the following modules:

Radio Link Monitor (RLM) module, and

PROP module.

In particular, during simulation, the RLM module has the target to measure the received power and the interferences for all devices that participate in the simulation.

Accordingly, that module is unique for the complete network that has to be simulated and operates in the following manner:

each PHY that accesses the channel for transmission of any packet, either STA_PHY or AP_PHY, communicates this request to the RLM;

the RLM updates a table containing the identifications of the currently active transmitters;

each PHY of the receivers, either STA_PHY or AP_PHY, queries the RLM in order to know the net-receiving-power and the level of interference. During the interrogation, the PHY communicates to the RLM its own identification, the identification of the transmitter and the operational frequency; and the RLM should have a-priori knowledge of the positions of all STA, in order to perform the requested calculations.

In order to perform these calculations, the RLM attaches to the PROP module, which is also unique for the complete network. The PROP module implements during simulation the models for the specific propagations for the environment in which the network is supposed to be installed in.

The simplest model of propagation that can be used by the PROP module is for example that of free space. According to this model, the power PI that a receiver receives from the i-th transmitter can be expressed by the following equation:

$$P_i = \frac{P_{ti} G_{ti} G_r c^2}{d_i^2 f_i^2 (4\pi)^2}$$

where $P_{ti}$ is the transmission power of the i-th transmitter, $G_{ti}$ is the gain of the transmitter antenna, $G_r$ is the gain of the receiver antenna, $d_i$ is the distance between the receiver and the i-th transmitter, c is the speed of light in free space and $f_i$ is the operation frequency of the i-th transmitter.

In an indoor environment, this model can be modified and optimised by different known methods that are available e.g. in "Wireless Communications—Principles and Practice", Theodore S. Rappaport, Prentice Hall PTR, New Jersey, 1996, pp. 70-73 e 122-133.

The basic principles of operation of a STA and AP WLAN, which are compliant to the standard IEEE 802.11 are represented in the state machine shown the document "(ISO/IEC 8802-11: 1999) IEEE Standards for Information Technology—Telecommunications and Information Exchange between Systems—Local and Metropolitan Area Network—Specific Requirements—Part 11: Wireless LAN Medium Access Control (MAC) and Physical Layer (PHY) Specifications" (see especially FIG. 8 of the captioned IEEE Document).

However, according to the present invention the implementation of said state machine in the architecture of the simulator has been realized by distinguishing between STA and AP.

Figure 7:
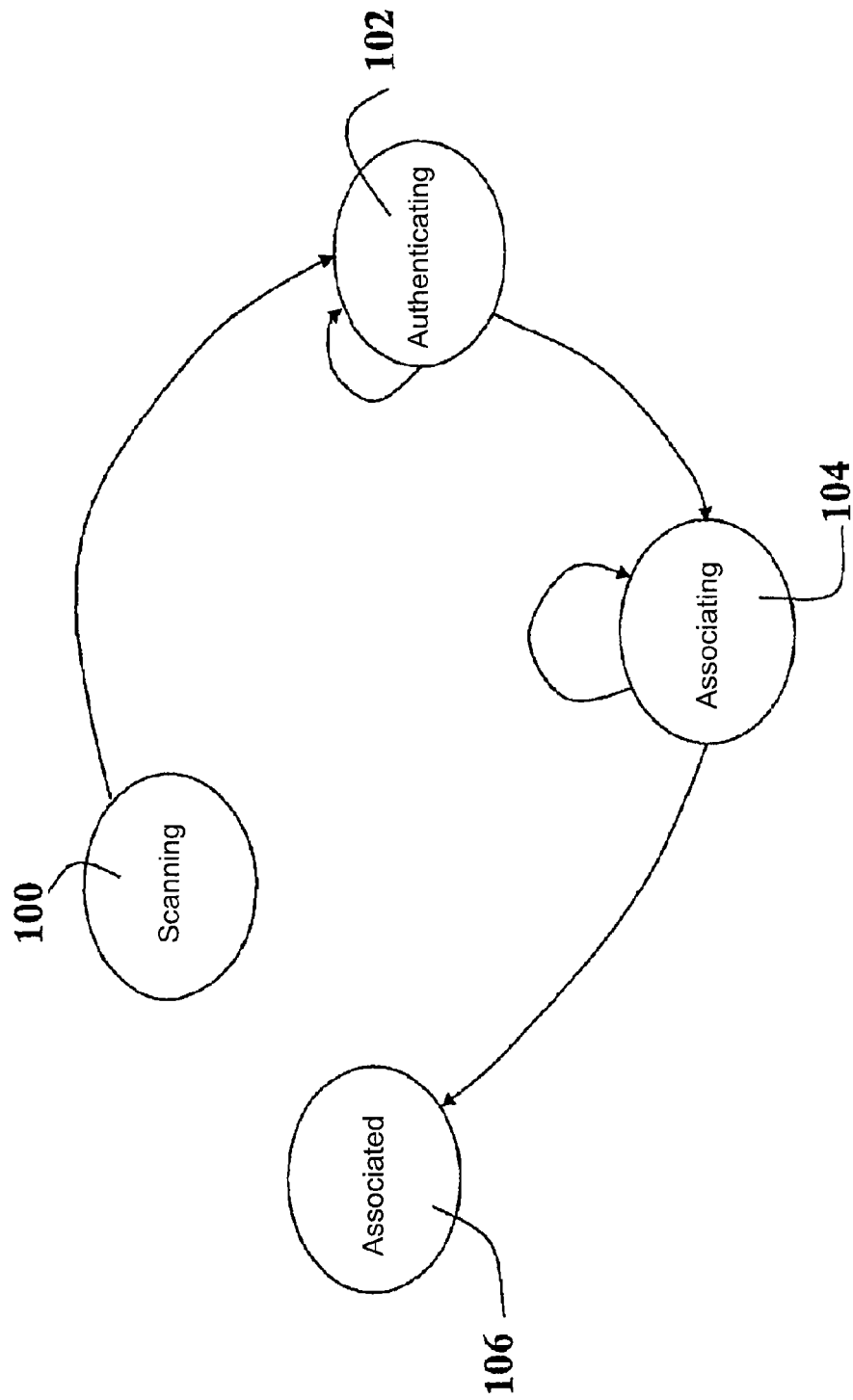

In particular, for the STA has been defined a first state machine, shown in FIG. 7, that controls the operation of the STA_SME module and a second state machine, shown in FIG. 8, that controls the operation of the STA_MAC module. For the AP only one state machine has been defined, as shown in FIG. 9, that controls the operation of the AP_MAC module.

In any case, the current state of the STA_MAC module and the AP_MAC module are stored in suitable variables called STAStatus and APjoining. The variable APjoining contains a number of variables equal to the number of STA communicating with the AP.

With reference to FIG. 7, the state machine of the STA_SME module operates in the following way:
- during the start-up of the STA, the STA_SME module is set in a "Scanning" state 100, in which the procedure for scanning the available channels is started by sending the primitive MLME_SCAN_REQ to the STA_MAC module. The operation of scanning comprises the scanning of all available channels, one by one, in order to reveal on each channel the presence of at least one Access Point to be utilized for communication. In detail, a primitive is a message that should contain several parameters stored in specific fields of the message. This message is exchanged between two modules of the same device. In particular, the primitive of the type xxx_REQ means that a transmitting module requests from the receiving module the execution of an action. With the xxx_CONF primitive a transmitting module confirms the execution of the xxx_REQ primitive to a receiving module. In this case, the STA_SME module requests from the STA_MAC module the activation of the channel scanning;
- after the reception of the MLME_SCAN_CONF primitive, which has been send by the STA_MAC module to the STA_SME module at the end of the channel scanning, the STA_SME module:
  selects the AP with which it performs authentication;
  starts the authentication by sending the MLME_AUTHENTICATE_REQ primitive to the STA_MAC module, with which the STA_SME module requests the STA_MAC module to start the authentication procedure;
  at the same moment the module switches to the "Authenticating" state 102;
- after receiving the MLME_AUTHENTICATE_CONF primitive with the parameter "unsuccess" (the STA had not been able to perform authentication) from the STA_MAC module, the STA_SME module remains in the "Authenticating" state 102 and repeats the procedure of authentication by re-transmitting the MLME_AUTHENTICATE_REQ primitive to the STA_MAC module. With the MLME_AUTHENTICATE_CONF primitive, the STA_MAC module communicates to the STA_SME module the execution of the authentication procedure;
- when in the "Authenticating" state 102, after receiving the MLM_AUTHENTICATE_CONF primitive with the parameter "success", the STA_SME module:
  starts the procedure of association with the AP with which the STA has been authenticated by sending the MLME_ASSOCIATE_REQ primitive to the STA_MAC module. With the MLME_ASSOCIATE_REQ primitive, the STA_SME module can request the STA_MAC module to start the association procedure;
  at the same moment the module switches to the "Associating" state 104;
- when in the "Associating" state 104, after receiving the MLME_ASSOCIATE_CONF primitive with the parameter "unsuccess" (the STA had not been able to perform association) from the STA_MAC module, the STA_SME module remains in the "Associating" state 104 and repeats the procedure of association;
- when in the "Associating" state 104, after receiving the MLM_ASSOCIATE_CONF primitive with the parameter "success", the STA_SME module switches to the "Associated" state 106.

The "Scanning" state 100 is started, not only after the start-up of the STA, but also after its reset, which corresponds to the disconnection from the AP and the subsequent reinitialization of all internal variables of the STA modules; it corresponds at the moment the STA decides to search an AP with higher signal power than that it is currently communicating with (handover).

Preferably, for permitting operation of the state machine of FIG. 7 the following constants can be used, which can be read e.g. from an input file:
AuthTimeout: maximum wait time for the authentication of the STA with an AP; this timeout:
  is inserted by the STA_SME module in the MLME_AUTHENTICATE_REQ primitive;
  is started by the STA_MAC module at the reception of the MLME_AUTHENTICATE_REQ primitive;
  is stopped by the STA_MAC module at the reception of the Authentication response frame, which has been transmitted by the AP with which it is performing authentication;
AssTimeout: maximum wait time for the association of the STA with an AP; this timeout:
  is inserted by the STA_SME module in the MLME_ASSOCIATE_REQ primitive;
  is started by the STA_MAC module at the reception of the MLME_ASSOCIATE_REQ primitive;

is stopped by the STA_MAC module at the reception of the Association response frame, which has been transmitted by the AP with which it is performing association;

ListaFreq: list of frequencies that the STA is able to utilize for communication with the AP and with which the STA performs scanning. This list is inserted by the STA_SME module in the MLME_SCAN_REQ primitive.

With reference to FIG. 8, the state machine of the STA_MAC module operates in the following manner:

during the start-up of the STA, the STA_MAC module is set in the "Unauthenticated/Unassociated" state 200. This current state is stored in the STAStatus variable of the STA_MAC module;

when in the "Unauthenticated/Unassociated" state 200, at the reception of the MLME_AUTHENTICATE_REQ primitive from the STA_SME module:
the STA_MAC module transmits to the AP the authentication request frame,
the STA_MAC module starts a timer called "AuthTimeout",
the variable STAStatus of the STA_MAC module is set to "Waiting Authentication" 202;

when in the "Waiting Authentication" state 202, the variable STAStatus of the STA_MAC module is set to the "Authenticated/Unassociated" state 204 if the module receives a PHY_DATA_IND primitive from the STA_PHY module containing a parameter that indicates that the STA_PHY module has received from the AP the response to the authentication request (authentication response frame). In particular, with the xxx_IND primitive a transmitting module communicates to a receiving module the occurrence of an event. In this case the module STA_PHY communicates to the STA_MAC module the reception of the authentication response packet from the AP;

if said primitive does not arrive until the timer "AuthTimeout" finishes, the variable STAStatus of the STA_MAC module returns into the "Unauthenticated/Unassociated" state 200;

when in the "Unauthenticated/Unassociated" state 200, if the module receives the MLME_ASSOCIATE_REQ primitive from the STA_SME module:
the STA_MAC module transmits the association request (association request frame) to the AP,
the STA_MAC module starts the "ASSTimeout" timer,
the variable STAStatus of the STA_MAC module is set to the "Waiting Association" state 206;

when in the "Waiting Association" state 206, the variable STAStatus of the STA_MAC module is set to the "Authenticated/Associated" state 208 if the module receives a PHY_DATA_IND primitive from the STA_PHY module containing a parameter that indicates that the STA_PHY module has received from the AP the response to the association request (association response frame);

if said primitive does not arrive until the timer "AssTimeout" finishes, the variable STAStatus of the STA_MAC module returns into the "Authenticated/Unassociated" state 204.

In the "Authenticated/Associated" state 204, the STA_MAC module is ready for data transmission.

The "Unauthenticated/Unassociated" state 200 is started after the reset of the STA, which corresponds to the disconnection from the AP and the subsequent reinitialization of all internal variables of the STA modules.

Preferably, for the correct operation of the state machine of FIG. 8 the following constants can be used, which can be read e.g. from an input file:
AUTH_REQdim: dimension in byte of the authentication request frame,
ASS_REQdim: dimension in byte of the association request frame.

With reference to FIG. 9, the state machine of the AP_MAC module operates in the following way:

during the start-up of the STA, the AP_MAC module is set in the "Unauthenticated/Unassociated" state 300. In detail, this state is stored in the APJoining variable, which contains the current states of the AP_MAC module relative to particular STA;

after the reception of a PHY_DATA_IND primitive from the AP_PHY module with the parameter indicating that the AP_PHY module has received from a certain STA an authentication request (authentication request frame), the variable APJoining of the AP_MAC module relative to said STA is set in the "Confirming Authentication" state 302. At the same time the AP_MAC module starts a timer called "APAuthTimeout". During this state, the AP_MAC module transmits to said STA the authentication response frame;

after the reception of a PHY_DATA_IND primitive from the AP_PHY module with the parameter indicating that the AP_PHY module has received from a certain STA the acknowledgment relative to the previous authentication response frame, the variable APJoining of the AP_MAC module relative to said STA is set in the "Authenticated/Unassociated" state 304;

the variable APJoining relative to said STA returns into the "Unauthenticated/Unassociated" state 300, if said PHY_DATA_IND primitive does not arrive until said timer "APAuthTimeout" finished;

after the reception of a PHY_DATA_IND primitive from the AP_PHY module with the parameter indicating that the AP_PHY module has received from a certain STA an association request (association request frame), the variable APJoining of the AP_MAC module relative to said STA is set in the "Confirming Association" state 306. At the same time the AP_MAC module starts a time called "APAssTimeout". During this state, the AP_MAC module transmits to said STA the association response frame;

after the reception of a PHY_DATA_IND primitive from the AP_PHY module with the parameter indicating that the AP_PHY module has received from a certain STA the acknowledgment relative to the previous association response frame, the variable APJoining of the AP_MAC module relative to said STA is set in the "Authenticated/Associated" state 308.

the variable APJoining relative to said STA returns into the "Authenticated/Unassociated" state 304, if said PHY_DATA_IND primitive does not arrive until said timer "APAssTimeout" finished.

In the "Authenticated/Associated" state 308 the AP_MAC module is ready for communication with said STA.

The "Unauthenticated/Unassociated" state 300 is started after the reset of the AP, which causes the disconnection of all STAs and the reinizialization of all internal variables of the AP modules.

Preferably, for the correct operation of the state machine of FIG. 9, the following constants, which can be read e.g. from an input file, are useful:
AUTH_RESPdim: dimension in byte of the authentication response frame;

ASS_RESPdim: dimension in byte of the association response frame;

APAuthTimeout: maximum timeout for the authentication of the STA. This timeout:
  is started by the AP_MAC module at the reception of an authentication request frame,
  is stopped by the AP_MAC module at the reception of the acknowledgment from the STA in response to the authenticate response frame;

APAssTimeout: maximum timeout for the association of the STA. This timeout:
  is started by the AP_MAC module at the reception of an association request frame,
  is stopped by the AP_MAC module at the reception of the acknowledgment from the STA in response to the association response frame.

The STA_SME and the AP_SME model, as they are implemented in the architecture of the simulator, realize all operations that are necessary to guarantee the correct operation of the AP and the STA. In detail:

the STA_SME module manages the following operation:
  initialization of the STA, comprising the initialization of all variable utilised in the STA_PHY module, STA_MAC module, etc.;
  frequency scanning of the channels with the aim to detect the channel containing the Access Points to be utilised for communication;
  selection of the AP to be utilised for communication among those found during channel scanning. This selection can be done based on the received power of the signals transmitted by the detected AP;
  reset of the STA in case the system is blocked or due to supposed malfunctions;
  selection of the transmission rate for data transmission to the AP. This selection can be done based on the channel quality (rate switching);
  changing the Access Point to be utilized for communication (handover), if e.g. another AP is found from which the STA receives a higher power and/or the signal of the previous one is decreasing under a certain threshold;
  implementation of Transmission Power Control (TPC) and Dynamic Frequency Selection (DFS) algorithms to be in conformity with the IEEE 802.11h-2003 standard "IEEE Standard for Information technology—Telecommunications and Information Exchange Between Systems—LAN/MAN Specific Requirements—Part 11: Wireless LAN Medium Access Control (MAC) and Physical Layer (PHY) Specifications: Spectrum and Transmit Power Management Extensions in the 5 GHz band in Europe";

the AP_SME module manages the following operations:
  initialization of the AP, comprising the initialization of all variable utilised in the AP_PHY module, AP_MAC module, etc.;
  reset of the AP in case the system is blocked or due to supposed malfunctions;
  selection of the transmission rate for data transmission to the relative STA. This selection can be done based on the channel quality (rate switching);
  admission control for the different STA modules,
  load balancing; preferably this is done by disassociating any overactive STA;
  implementation of Transmission Power Control (TPC) and Dynamic Frequency Selection (DFS) algorithms to be in conformity with the IEEE 802.11h-2003 standard "IEEE Standard for Information technology—Telecommunications and Information Exchange Between Systems—LAN/MAN Specific Requirements—Part 11: Wireless LAN Medium Access Control (MAC) and Physical Layer (PHY) Specifications: Spectrum and Transmit Power Management Extensions in the 5 GHz band in Europe".

Some of the operations implemented in the STA_SME and the AP_SME module are described by mean of the following example. Those modules can perform also other operations and may also contain algorithms different from those stated previously.

The initialization procedure of the STA comprises the initialization of all modules comprised in the STA (STA_PHY, STA_MAC, etc.).

The initialization procedure of the AP comprises the initialization of all modules comprised in the AP (AP_PHY, AP_MAC, etc.).

As stated, the STA_SME module decides execution of the channel scanning procedure. Said procedure of channel scanning is preferably implemented in the simulator in the manner illustrated in the flow chart of FIG. 10:

the STA_SME module sends to the STA_MAC module the MLME_SCAN_REQ primitive with the frequency list to be utilised by the STA; based on those frequencies channel scanning is performed (step 10);

the STA_MAC module sends the PHY_SCAN_REQ primitive to the STA_PHY containing one frequency of said frequency list (step 11);

the STA_PHY module, after reception of said PHY_SCAN_REQ primitive, requests the RLM to find the AP with the highest output power on this frequency (step 12);

if at least one AP is present on the frequency (step 13), the RLM communicates to the STA_PHY module the identifier of the AP from which it will receive the highest power (step 14);

the STA_PHY module sends to the STA_MAC module the PHY_SCAN_IND primitive with the identification of the AP and the cell received from the RLM (step 15);

the STA_PHY module waits for the reception of the so called Beacon frame from the indicated AP. Said packet indicates a periodically broadcast frame sent by all APs (step 16);

after receiving the Beacon, the STA_PHY module requests the RLM module the net power and the receiving interference (step 17);

the RLM module communicates to the STA_PHY module the requested values (step 18);

based on the received numerical values, the STA_PHY module verifies the correct reception of the Beacon (step 19);

if the Beacon has been received correctly, the STA_PHY module transmits to the STA_MAC module the PHY_RXSTART_IND primitive with the parameter RXVECTOR, which contains the values of the received power (step 20). With the PHY_RXSTART_IND primitive, the STA_PHY module communicates to the STA_MAC module the correct reception of a frame;

if the Beacon has been received erroneously, the STA_PHY module transmits to the STA_MAC module the PHY_RXEND_IND primitive (step 21). With the PHY_RXEND_IND primitive, the STA_PHY module communicates to the STA_MAC module the erroneous reception of a frame;

if the STA_MAC module receives the PHY_RXSTART_IND primitive, the module verifies if said frequency list contains other frequencies (step 22);

if said frequency list contains other frequencies (step 22) the STA_MAC module re-transmits the PHY_SCAN_REQ primitive to the STA_PHY module with a new frequency (step 11);

if the frequency list contains no other frequencies (step 22), the frequency scanning procedure is stopped with the transmission by the STA_MAC module to the STA_SME module of the MLME_SCAN_CONF primitive containing the results of the procedure (step 26);

after the transmission of the PHY_RXEND_IND (step 21), the STA_PHY module starts a timer ScanInterval (step 25). After the timeout of said timer the STA_MAC module verifies if said frequency list contains other frequencies (step 22);

during step 13, if the current frequency does not contain any AP, the RLM module communicates to the STA_PHY module the absence of AP (step 23);

as a consequence the STA_PHY module transmits to the STA_MAC module the PHY_SCAN_IND primitive without any parameter (step 24) and the STA_PHY module starts the timer ScanInterval (step 25);

after the timeout of said timer the STA_MAC module verifies if said frequency list contains other frequencies (step 22).

Preferably, the result of the scanning procedure, which is transmitted by the STA_MAC module to the STA_SME module by mean of the MLME_SCAN_CONF primitive, is a table as shown below.

| Frequency | AP Identifier | Power Received |
|---|---|---|
| $f_1$ | AP1 | $Prx_1$ |
| $f_2$ | AP2 | $Prx_2$ |
| $f_3$ | | |
| $f_4$ | AP4 | |
| $f_n$ | APn | $Prx_n$ |

Each row in the table refers to a frequency and the table lists for each frequency the identification of the AP present on that frequency, and the values of the received power by the SME, which have been calculated by the RLM. In the example considered, APs are present on the frequencies f1, f2, and fn. No AP is present on f3. On the frequency f4 an AP is indeed present, but the STA had not received correctly the Beacon frame and consequently, the value of the received power is not present.

During the scanning procedure two primitives are used, which are not present in the standard: PHY_SCAN_REQ and PHY_SCAN_IND. Both are used during execution of the module and therefore do not interfere with the interoperability between devices.

With the first primitive, the module STA_MAC asks the STA_PHY module to listen to possible Beacon on certain channels for a predetermined time.

With the second primitive, at the timeout of the time interval, the STA_PHY module communicates to the STA_MAC module the identifications of the AP of which the module had received the Beacon and the signal level. For the correct operation of the scanning procedure, it is preferable to read the value ScanInterval for said timer from an input file.

The selection of the AP to be utilised for communication is determined by the STA and the preferred embodiment in the architecture of the simulator comprises the following steps, see FIG. 11:

the STA_SME module reads the table received by the MLME_SCAN_CONF primitive (step 30);

if the table contains at least one row with a received power value (step 31), the STA_SME module selects the AP with the highest received power value (step 32);

the STA_SME module stores the identification of the AP, the identification of the cell and the operation frequency in three variables (step 33);

the STA_SME module transmits to the STA_PHY module said three variables, by means of the PHY_SET primitive (step 34), with which a parameter of the PHY is changed, and the procedure stops;

during step 31, if the table does not contain any values of received power, the procedure stops without results.

The primitive PHY_SET is utilised differently with respect to the standard, since it is not specified that this primitive can be utilised to change the operation frequency of the STA_PHY module.

In the preferred embodiment of the simulator described herein, the handover procedure involves executing the channel scanning procedure and selecting the AP by the STA, if the signal power decreases under a certain threshold. This threshold is preferably configurable by an input file.

The execution of the reset procedure of the STA module is decided by the STA_SME module. In particular, the STA_SME module has a certain variable FailCounter that is incremented any time the module receives the MLME_FAILEDTX_IND primitive from the STA_MAC module. Said primitive is transmitted if the STA_MAC module decides to eliminate a packet because the maximum amount of re-transmissions has been reached. The reset procedure comprises the following operations:

the STA_SME module sends the MLME_RESET_REQ primitive to the STA_MAC module, with which the STA_SME module requests the STA_MAC module to reset;

the STA_SME module sends the MLME_RESET_REQ primitive to the STA_PHY module, with which the STA_SME module requests the STA_PHY module to reset;

the SMA_SME module is set, according to FIG. 7 into the "Scanning" state;

the STA_MAC module is set, according to FIG. 8, into the "Unauthenticated/Unassociated" state;

the STA_PHY module reinitializes all its variables;

the STA_MAC module reinitializes all its variables and removes all scheduled events (timer, buffer, etc).

During the reset procedure, the MLME_FAILEDTX_IND primitive, which is not present in the IEEE 802.11 standard, has been introduced while the PHY_RESET_REQ primitive has been renamed with respect to the original PLME_RESET_REQ. This change of name is due to the inclusion of the PLME in the PHY level. In particular, the MLME_FAILEDTX_IND primitive is sent by the STA_MAC module to the STA_SME module each time a packet is discarded definitely due to maximum retransmissions specified by the MAC protocol reached. This variable FailCounter is set to zero by the MLME_OKTX_IND primitive each time a packet has been transmitted successfully, which is equivalent to the correct reception of an acknowledgment by the STA_MAC module. For the correct operation of the reset procedure, the value Nfailures, namely the maximum value that the variable FailCounter can reach is preferably read from an input file.

The execution of the reset procedure of the AP module is decided by the AP_SME module. In particular the AP_SME module keeps a vector of variables called FailCounter with a size equal to the number of STAs associated to the AP. The element of that vector corresponding to the i-th STA, is incremented any time the AP_SME module receives from the AP_MAC module the MLME_FAILEDTX_IND primitive. Similar to the STA, this primitive is transmitted by the AP_MAC module to the AP_SME module if the AP_MAC module decided to eliminate a packet to be sent to a particular STA, because the maximum number of retransmissions has been reached. That primitive contains the identification of that STA. The procedure of reset involves only the elements of the AP regarding that STA and comprises the following operation:

- the AP_SME module sends to the STA_MAC module the MLME_RESET_REQ;
- the AP_SME module sends to the STA_PHY module the PHY_RESET_REQ;
- the AP_MAC module is set, according to FIG. 9, into the "Unauthenticated/Unassbciated" state;
- the AP_PHY module reinitializes all its variables related to that STA;
- the AP_MAC module reinitializes all its variables related to said STA and removes all scheduled events related to said STA (timer, buffer, etc).

Also for the reset of the AP the MLME_FAILEDTX_IND primitive, which is not present in the standard, has been introduced whereas the PHY_RESET_REQ primitive has a different name with respect to the original PLME_RESET_REQ primitive.

For the correct operation of the reset procedure the value Nfailures, namely the maximum value that the variable FailCounter can reach, is preferably read from an input file.

The selection of the transmission rate of the STA is based on the Automatic Rate Fallback procedure described in the document by A. Kamerman, L. Monteban, "WaveLAN-II—A High-Performance Wireless LAN for the Unlicensed Band" Bell Labs Technical Journal, Summer 1997. Every time the procedure determines a transmission rate variation for the STA module, the STA_SME module sends to the STA_MAC module the MLME_SET_REQ primitive with the indication of the new transmission rate.

For the implementation of the procedure a primitive called MLME_RATE_ACKRX primitive (which is not present in the IEEE 802.11 standard) is defined and transmitted from the STA_MAC module to the STA_SME module. The primitive contains the indication if the STA_MAC module has received or not an Acknowledgement in response to a packet just transmitted. If the Acknowledgement is received, the primitive is sent from the STA_MAC module to the STA_SME module at the moment the Acknowledgement is received; on the contrary, the primitive is sent from the STA_MAC module to the STA_SME module at the end of the AckTimeout.

The selection of the transmission rate of the AP is carried out in the same way of the selection of the transmission rate of the STA. Although, in the AP case the procedure is applied in an independent manner with respect to the single STA, thus in the MLME_RATE_ACKRX primitive is also present the STA identifier related to the STA toward which the packet is sent.

The procedure reads from the input file the value AckTimeout, namely the maximum wait time for the confirmation of the correct reception of a data frame or a management frame (such as the Authentication Request frame) by a STA or an AP. This time out:

- is started by the STA_MAC module of an apparatus at the end of the transmission of a data frame or a management frame to another apparatus;
- is stopped at the reception, from the STA_MAC module, of the Acknowledgement frame that confirms the correct reception of the data frame or the management frame just transmitted.

Consequently, without prejudice to the underlying principles of the invention, the details and the embodiments may vary, even appreciably, with reference to what has been described by way of example only, without departing from the scope of the invention as defined by the annexed claims.

The invention claimed is:

1. A method of simulating a wireless local area network in a combination of said wireless local area network and at least one mobile communication network, comprising the steps of:
   providing a first set and a second set of access protocol simulation devices representative of wireless local area network apparatus implementing access protocols, wherein said first set of access protocol simulation devices is representative of radio technology independent apparatus providing integration of said wireless local area network with said at least one mobile communication network and said second set of access protocol simulation devices is representative of radio technology dependent apparatus present in said wireless local area network; and
   simulating different types of wireless local area network technology in said wireless local area network by varying the access protocol simulation devices in said second set while maintaining the access protocol simulating devices in said first set.

2. The method of claim 1, further comprising the step of selecting said at least one mobile communication network from:
   a second generation mobile communication network;
   a third generation mobile communication network; or
   a combined second generation and third generation mobile communication network.

3. The method of claim 1, further comprising the step of selecting said at least one mobile communication network as a combined mobile communication network comprising a plurality of interoperating mobile communication networks.

4. The method of claim 1, further comprising the step of including in said second set of access protocols simulation devices, simulation devices for simulating integration with at least one wired technology network or an xDSL network.

5. The method of claim 1, further comprising the step of including in said second set of access protocol simulation devices, simulation devices representative of wireless local area network apparatus selected from: wireless metropolitan area network, high performance radio access network, high performance radio metropolitan area network, IEEE 802.16, wireless personal area network, Bluetooth and IEEE 802.15 networks.

6. The method of claim 1, further comprising the step of providing terminal simulation devices representative of the terminals in said combination, wherein said terminal simulation devices are selected from:
   first terminal simulation devices representative of wireless local area network-only terminals provided only with a wireless local area network interface, and
   second terminal simulation devices representative of plural mode terminals provided with WLAN plus mobile communication network interfaces.

7. The method of claim 1, further comprising the step of:
   providing access network simulation devices representative of access network devices in said wireless local area network comprising access point and access point controller apparatus, and
   providing said first set of access protocol simulation devices both for said access point apparatus and for said access point controller apparatus.

8. The method of claim 1, further comprising the step of providing core network simulation devices representative of apparatus in the core network of said wireless local area network providing packet switched services over said wireless local area network.

9. A method comprising:
simulating a wireless local area network in combination with at least one mobile communication network; and
based on the results of said simulation, modifying a current configuration of the wireless local area network combined with at least one mobile communication network into a new combined network configuration;
said simulation being accomplished in accordance to claim 1.

10. A simulator system for simulating a wireless local area network in a combination of said wireless local area network and at least one mobile communication network, comprising:
a first set and a second set of access protocol simulation devices representative of wireless local area network apparatus implementing access protocols, wherein said first set of access protocol simulation devices is representative of radio technology independent apparatus providing integration of said wireless local area network with said at least one mobile communication network and said second set of access protocol simulation devices is representative of radio technology dependent apparatus present in said wireless local area network, the system being configured for simulating different types of wireless local area network technology in said wireless local area network by varying the access protocol simulation devices in said second set while maintaining the access protocol simulating devices in said first set.

11. The system of claim 10, wherein said at least one mobile communication network is selected from:
a second generation mobile communication network;
a third generation mobile communication network; or
a combined second generation and third generation mobile communication network.

12. The system of claim 10, wherein said at least one mobile communication network is selected as a combined mobile communication network comprising a plurality of interoperating mobile communication networks.

13. The system of claim 10, wherein said second set of access protocols simulation devices comprises simulation devices for simulating integration with at least one wired technology network, or an xDSL network.

14. The system of claim 10, wherein said second set of access protocol simulation devices comprises simulation devices representative of wireless local area network apparatus selected from: wireless metropolitan area network, high performance radio access network, high performance radio metropolitan area network, IEEE 802.16, wireless personal area network, Bluetooth and IEEE 802.15 networks.

15. The system of claim 10, further comprising terminal simulation devices representative of the terminals in said combination, wherein said terminal simulation devices are selected from:
first terminal simulation devices representative of wireless local area network-only terminals provided only with a wireless local area network interface, and
second terminal simulation devices representative of plural mode terminals provided with wireless local area network plus mobile communication network interfaces.

16. The system of claim 15, wherein said second terminal simulation devices comprises simulation devices representative of:
dual-mode terminals provided with a wireless local area network interface plus one of a second generation interface and a third generation interface, and
multimode terminals provided with a wireless local area network interface plus second generation and third generation interfaces.

17. The system of claim 10, further comprising access network simulation devices representative of access network devices in said wireless local area network comprising access point and access point controller apparatus.

18. The system of claim 17, further comprising said first set of access protocol simulation devices both for said access point apparatus and for said access point controller apparatus.

19. The system of claim 10, further comprising core network simulation devices representative of apparatus in the core network of said wireless local area network providing packet switched services over said wireless local area network.

20. The system of claim 19, wherein said core network simulation devices comprise simulation devices representative of apparatus in said wireless local area network selected out of wireless access gateway apparatus and packet data gateway apparatus.

21. The system of claim 20, further comprising core network simulation devices representative of said wireless access gateway apparatus configured for acting as an internet protocol router for routing internet protocol packets exchanged between the access point controller apparatus and said packet data gateway.

22. The system of claim 20, further comprising core network simulating devices representative of packet data gateway apparatus in said wireless local area network to terminate both the internet protocol within the core network of said wireless local area network and tunneling with the terminals in said wireless local area network.

23. A simulated communication network for simulating provision of services to users via network devices in said simulated communication network, said simulated network comprising a combination of a wireless local area network and at least one mobile communication network, wherein said simulated communication network comprises a system according to claim 10.

24. A non-transitory computer-readable storage medium encoded with a computer program product loadable in the memory of at least one computer, the computer program product comprising software code portions capable of implementing the method of claim 1.

* * * * *